(12) United States Patent
Serati et al.

(10) Patent No.: US 10,509,296 B2
(45) Date of Patent: Dec. 17, 2019

(54) COMPACT LIQUID CRYSTAL BEAM STEERING DEVICES INCLUDING MULTIPLE POLARIZATION GRATINGS

(71) Applicant: Boulder Nonlinear Systems, Inc., Lafayette, CO (US)

(72) Inventors: Steven A. Serati, Westminster, CO (US); Douglas J. McKnight, Boulder, CO (US)

(73) Assignee: BOULDER NONLINEAR SYSTEMS, INC., Lafayette, CO (US)

( * ) Notice: Subject to any disclaimer, the term of this patent is extended or adjusted under 35 U.S.C. 154(b) by 14 days.

(21) Appl. No.: 15/655,208

(22) Filed: Jul. 20, 2017

(65) Prior Publication Data

US 2017/0315423 A1    Nov. 2, 2017

Related U.S. Application Data

(62) Division of application No. 15/098,162, filed on Apr. 13, 2016.

(51) Int. Cl.
*G02B 27/42* (2006.01)
*G02F 1/29* (2006.01)

(52) U.S. Cl.
CPC ......... *G02F 1/292* (2013.01); *G02B 27/4261* (2013.01); *G02B 27/4277* (2013.01)

(58) Field of Classification Search
CPC ............... G02F 1/292; G02F 2201/305; G02F 2203/07; G02F 1/0136; G02F 1/1393; G02F 2001/133638; G02F 2203/24; G02F 2201/30; G02F 2001/133541; G02B 5/3025; G02B 5/3083; G02B 5/1833; G02B 27/283; G02B 27/4277; G02B 5/1842; G03H 2223/22; G03H 2223/23; G06F 3/013

See application file for complete search history.

(56) References Cited

U.S. PATENT DOCUMENTS

| | | | |
|---|---|---|---|
| 2010/0225856 A1* | 9/2010 | Escuti | G02B 5/1833 349/96 |
| 2011/0242461 A1* | 10/2011 | Escuti | G02F 1/133504 349/96 |
| 2013/0027713 A1* | 1/2013 | Kudenov | G01J 4/04 356/491 |
| 2013/0293940 A1* | 11/2013 | Kroll | G02F 1/1347 359/9 |
| 2013/0335683 A1* | 12/2013 | Escuti | G02F 1/133528 349/96 |
| 2014/0361990 A1* | 12/2014 | Leister | G02F 1/1323 345/156 |

* cited by examiner

*Primary Examiner* — Huyen L Ngo
(74) *Attorney, Agent, or Firm* — Neugeboren O'Dowd PC

(57) ABSTRACT

Systems, methods, and apparatus are disclosed for attenuating an incident polarized light beam using a plurality of Liquid Crystal Polarization Gratings ("LCPGs") and one or more switchable liquid crystal layers. When four LCPGs are used, a spacing between first and second LCPGs can be equal to a spacing between third and fourth LCPGs. Pi and FCL cells can also be used in place of more traditional LC switches. Switching of the LC switch can be imparted via an AC bias.

18 Claims, 15 Drawing Sheets

COMPACT LIQUID CRYSTAL BEAM STEERING DEVICES INCLUDING MULTIPLE POLARIZATION GRATINGS

CLAIM OF PRIORITY

The present application for patent is a divisional of U.S. patent application Ser. No. 15/098,162, filed Apr. 13, 2016, entitled "COMPACT LIQUID CRYSTAL BEAM STEERING DEVICES INCLUDING MULTIPLE POLARIZATION GRATINGS," which is hereby expressly incorporated by reference herein.

FIELD OF THE DISCLOSURE

The present disclosure relates to liquid crystal beam steering devices and, more particularly, to switchable liquid crystal-based beam steering devices including multiple liquid crystal polarization gratings and related methods.

BACKGROUND OF THE DISCLOSURE

Recent advances in liquid crystal polarization grating ("LCPG") technology have enabled the use of passive LCPGs, singly and in combination, to manipulate light, particularly in display applications (See, for example, U.S. Pat. No. 8,537,310 to Escuti, et al., which is incorporated herein in its entirety by reference). In general, passive LCPGs possess a permanent, continuously varying periodic polarization pattern to diffract incident light according to its polarization.

More recently, LCPGs have been combined with switchable liquid crystal ("LC") devices to provide low Size, Weight, and Power ("SWaP") beam steering devices (See, for example, U.S. Pat. No. 8,982,313 to Escuti, et al., and Boulder Nonlinear Systems white paper, "Core Technologies," September 2014, http://bnonlinear.com/wp-content/uploads/2014/09/Core-Technologies-White-Paper.pdf, accessed 30 Sep. 2015, which are incorporated herein in their entirety by reference). As an example, by incorporating fast electro-optic half-wave polarization retarders as a switch to control the handedness of polarization of the incident light, switchable beam steering devices with faster speed and lower SWaP compared to existing mechanical solutions, such as rotating Risley prisms, can be achieved.

As described, for example, in U.S. Pat. Nos. 8,537,310, 8,982,313 and "Core Technologies" whitepaper, passive LCPGs generally consist of a nematic LC film that is surface aligned and UV-cured to present a permanent, continuously varying periodic polarization pattern. The structure of such LCPGs provides an in-plane, uniaxial birefringence n that varies with position (i.e., $n(x)=[\sin(\pi x/\Lambda), \cos(\pi x/\Lambda), 0]$, where $\Lambda$ is the period of the grating). Such transmissive gratings efficiently (e.g., with greater than 99% efficiency) diffract circularly polarized light to either the first positive or negative order, based on the polarization handedness of the incident light.

As used herein, "zero-order" light propagates in a direction substantially parallel to that of the incident light, i.e., at a substantially similar angle of incidence when the light is incident on an optical system along an optical axis of the optical system, and is also referred to herein as "on-axis" light. For example, if the incident light is normally incident on the LCPG in a direction parallel to the optical axis, "zero-order" or "on-axis" light would also propagate substantially normally with respect to the first polarization grating. In contrast, "non-zero-order light," such as "first-order" light and/or "second-order light," propagates in a direction that is not parallel to the incident light nor the optical axis of the optical system. In particular, the second-order light propagates at greater angles than the first-order light relative to the angle of incidence. As such, first- and second-order light are collectively referred to herein as "off-axis" light.

LCPGs may be transparent, thin film, beam splitters that periodically alter the local polarization state and propagation direction of light traveling therethrough. Notably, during diffraction, the LCPG causes the polarization handedness of the incident light to flip to its orthogonal counterpart. Such characteristics are in contrast to conventional polarizers, which operate by permitting light of a first polarization state to travel therethrough, but absorbing light of an orthogonal, second polarization state.

A combination of two LCPGs may be aligned in parallel or in antiparallel configurations. Specifically, a "parallel" LCPG arrangement means the respective birefringence patterns of the two LCPGs have substantially similar orientations. In contrast, an "antiparallel" polarization grating arrangement means one LCPG has a birefringence pattern that is inverted or rotated by about 180 degrees relative to that of the other LCPG.

Non-mechanical beam steering can be achieved with an alternating stack of linear LCPGs and electro-optic half-wave retardance switches, some embodiments of which are described in the aforementioned U.S. Pat. No. 8,982,313. Non-mechanical beam steering devices (also known as beam scanners) provide numerous benefits over traditional gimbaled mechanical scanners due to their vastly reduced SWaP requirements and their ability to perform random access scanning. To achieve non-mechanical beam scanning with LCPGs, a nematic or ferroelectric liquid crystal modulator having an electronically controllable retardance is typically used as the retardance switch, as mentioned above. In this case, the retardance of the liquid crystal modulator is changed by applying a voltage to either produce a half-wave of retardance or nearly zero retardance through the cell. Since a half-wave retarder changes the handedness of circularly polarized light while a cell with no retardance does not affect the light's polarization, the incident light can be steered to a selected angle by controlling the handedness of circularly polarized light as it propagates through the LCPG stack. LCPGs have to date been demonstrated with apertures up to 50 mm.

It would be desirable to have alternative LCPG devices with further SWaP and performance advantages.

SUMMARY OF THE DISCLOSURE

One aspect of the disclosure is a liquid crystal beam steering device having a first polarization grating, a liquid crystal layer, a second polarization grating, a third polarization grating, an intermediate region, a fourth polarization grating, and an aperture. The first polarization grating can be configured to direct incident light into first and second beams having different directions of propagation than that of the incident light. The first and second beams can have substantially orthogonal circular polarizations with respect to each other. The liquid crystal layer can be configured to receive the first and second beams from the first polarization grating. The liquid crystal layer can be switchable between first and second states for introducing a first and second retardance, respectively, to the first and second beams. The second polarization grating can be spaced apart from the first polarization grating by a distance D and can be configured to receive the first and second beams from the liquid crystal layer. The second polarization grating can also be configured to alter the respective directions of propagation of the first and second beams according to the first or second retardance introduced to the first and second beams. The third polarization grating can be configured to receive the first and second beams from the second polarization grating and to further alter the respective directions of propagation thereof. The intermediate region can be configured to transmit the first and second beams from the third polarization grating therethrough. The fourth polarization grating configured to receive the first and second beams from the intermediate region and to additionally alter the respective directions of propagation thereof to provide output light. The aperture can be configured to transmit a first portion of both the first and second beams from the fourth polarization grating when the liquid crystal layer is in the first state, and to transmit a second portion of both the first and second beams from the fourth polarization grating therethrough when the liquid crystal layer is in the second state. The first portion can be greater than the second portion. The intermediate region can have a thickness less than the distance D and can be configured to separate the third and fourth polarization gratings by the distance D.

Another aspect of the present disclose is a liquid crystal beam steering device having a first polarization grating, a liquid crystal layer, a second polarization rating, a third polarization grating, an intermediate region, a fourth polarization grating, and an aperture. The first polarization grating can be configured to direct incident light into first and second beams having different directions of propagation than that of the incident light. The first and second beams can have substantially orthogonal circular polarizations with respect to each other. The liquid crystal layer can be configured to receive the first and second beams from the first polarization grating. The liquid crystal layer can be switchable between first and second states for introducing a first and second retardance, respectively, to light traveling therethrough. The second polarization grating can be spaced apart from the first polarization grating by a distance D1 and can be configured to receive the first and second beams from the liquid crystal layer to alter the respective directions of propagation of the first and second beams. Such altering of the directions of the first and second beams can be in response to each of the first and second states of the liquid crystal layer. The third polarization grating can be configured to receive the first and second beams from the second polarization grating to further alter the respective directions of propagation thereof. The intermediate region can have a thickness D2 and can be configured to transmit the first and second beams from the third polarization grating therethrough. The fourth polarization grating can be spaced apart from the third polarization grating by a distance D2 and can be configured to receive the first and second beams from the third polarization grating to additionally alter the respective directions of propagation thereof to provide output light that propagates in a direction substantially parallel to that of the first and second beams output from the second polarization grating. The aperture can be configured to block both first and second beams when the liquid crystal layer is in the second state. The aperture can also be configured to transmit both first and second beams therethrough when the liquid crystal layer is in the first state. The incident light can be characterized by a wavelength $\lambda$. The liquid crystal layer can exhibit a first refractive index $n1(\lambda)$ at the wavelength $\lambda$. The intermediate region can exhibit a second refractive index $n2(\lambda)$ at the wavelength $\lambda$. The distances D1 and D2 can be related by the equation $D1*\lambda*n1(\lambda)=D2*\lambda*n2(\lambda)$.

Yet a further aspect of the disclosure can be described as a liquid crystal beam steering device having a first polarization grating, a liquid crystal layer, a second polarization grating, a third polarization rating, an intermediate region, a fourth polarization grating, and an aperture. The first polarization grating can be configured to direct incident light into first and second beams having different directions of propagation than that of the incident light. The first and second beams can have substantially orthogonal circular polarizations with respect to each other. The liquid crystal layer can be configured to receive the first and second beams from the first polarization grating. The liquid crystal layer can be switchable between first and second states for introducing a first and second retardance, respectively, to light traveling therethrough. The second polarization grating can be spaced apart from the first polarization grating and configured to receive the first and second beams from the liquid crystal layer to alter the respective directions of propagation of the first and second beams in response to each of the first and second states of the liquid crystal layer. The third polarization grating can be configured to receive the first and second beams from the second polarization grating to further alter the respective directions of propagation thereof. The intermediate region can be configured to transmit the first and second beams from the third polarization grating therethrough while modifying the respective directions of propagation thereof. The fourth polarization grating can be configured to receive the first and second beams from the intermediate region to additionally alter the respective directions of propagation thereof to provide output light that propagates in a direction substantially parallel to that of the first and second beams output from the second polarization grating. The aperture can be configured to block both first and second beams when the liquid crystal layer is in the second state, and to transmit both first and second beams therethrough when the liquid crystal layer is in the first state.

BRIEF DESCRIPTION OF THE DRAWINGS

FIG. 2 illustrates the beam path when the LC polarization switch is in a first state, and FIG. 3 illustrates the beam path when the LC polarization switch is in a second state.

DETAILED DESCRIPTION OF EMBODIMENTS OF THE DISCLOSURE

Figure 1:
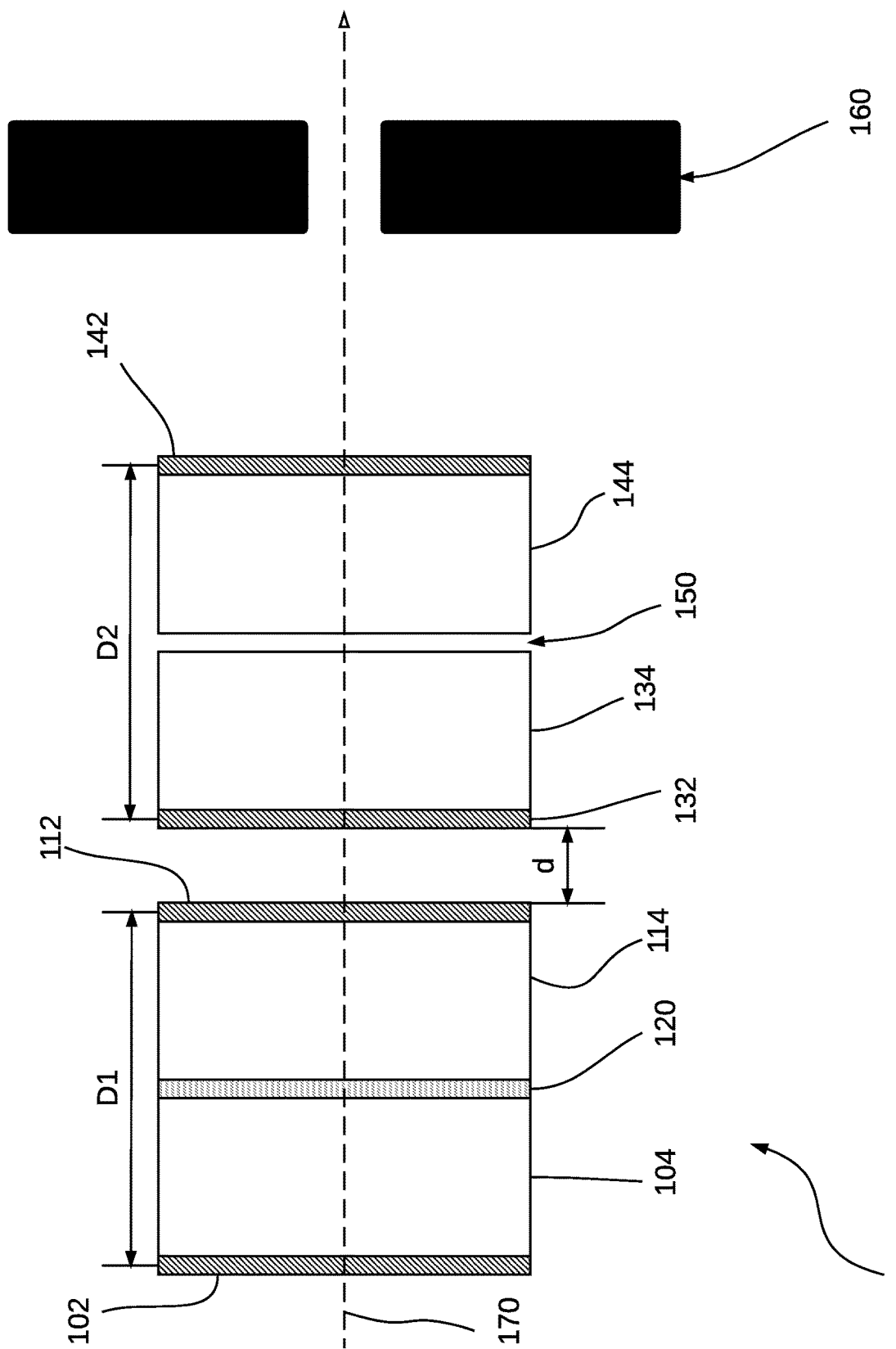
FIG. 1 illustrates a LCPG beam steering device including an LC polarization switch, in accordance with an embodiment of the present disclosure.

The present disclosure is described more fully hereinafter with reference to the accompanying drawings, in which embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. In the drawings, the size and relative sizes of layers and regions may be exaggerated for clarity. Like numbers refer to like elements throughout the specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present. Likewise, when light is received or provided "from" one element, it can be received or provided directly from that element or from an intervening element. On the other hand, when light is received or provided "directly from" one element, there are no intervening elements present.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

It will be understood by those having skill in the art that, as used herein, a "transmissive" or "transparent" substrate may allow at least some of the incident light to pass therethrough. Accordingly, the transparent substrate may be, for example, formed of glass, sapphire, or other materials.

Embodiments of the present disclosure are described herein with reference to the accompanying figures. Referring first to FIG. 1, a LC beam steering device 100 is described. LC beam steering device 100 includes a first LCPG 102, which is supported on a first substrate 104. A second LCPG 112, supported on a second substrate 114, is spaced apart from first LCPG 102 by a distance D1. First and second LCPGs 102 and 112 may be formed, for example, using methods described in U.S. Pat. No. 7,196,758 to Crawford et al., which is incorporated herein in its entirety by reference.

As shown in FIG. 1, first and second substrates 104 and 114, respectively, are configured to contain therebetween a liquid crystal ("LC") switch 120. LC switch 120 includes liquid crystal molecules that are configured to be switched between first and second states, in response to voltages applied thereacross. The surfaces of first and second substrates 104 and 114 that contain the LC switch are treated with alignment layers and transparent conductive layers (not shown) so as to align the LC switch in a desired configuration as well as to allow the application of a voltage across the LC switch. For example, the alignment layer may be a commercial polyimide coating, such as Nissan Chemical Industries SE-7492, and the transparent conductive layers may be formed, for example, of standard coatings such as Indium Tin Oxide ("ITO") or Indium Molybdenum Oxide ("IMO"). In some embodiments, an LC switch can also be referred to as a liquid crystal layer.

LC beam steering device 100 further includes a third LCPG 132, which is supported on a third substrate 134. Third LCPG 132 is separated from second LCPG 112 by a distance d. In some embodiments, the distanced may be the thickness of an optical adhesive or index-matching layer (not shown) used to bond together second and third LCPGs 112 and 132, respectively. Alternatively, second LCPG 112 and third LCPG 132 may be placed in direct contact with each other. In such embodiments, the distance d is much smaller than the distance D1 shown in FIG. 1.

Still further, LC beam steering device 100 includes a fourth LCPG 142, which is supported on a fourth substrate 134 and spaced apart from third LCPG 132 and its supporting third substrate 134 by a distance D2. A space 150 (or intermediate region) defined between third substrate 134 and fourth substrate 144 may be filled, for example, with a material such as an index-matching fluid, optical adhesive, or air.

It should be emphasized that various components in the figures described herein are not drawn to scale. For example, in FIG. 1 and subsequent figures, the various substrates may have thicknesses ranging from 50 to 2000 microns, or thicker, depending on the material used and desired characteristics. Also, LC switch 120 and space 150 may have a thickness, for example, in the range of 1 to 10 microns, depending on the material characteristics of the material used therein. In certain cases, the LC switch thickness may be less than one micron, or more than 10 microns, depending on the optoelectronic characteristics of the LC material.

LC beam steering device 100 additionally includes an aperture 160. For example, the aperture may be an explicit aperture in a piece of opaque material, as shown in FIG. 1. Alternatively, the aperture may be an implicit aperture created by the finite extent of another component, not shown, such as a lens or optical fiber, or by the acceptance aperture of a subsequent optical system. The components of LC beam steering device 100 in this exemplary embodiment are aligned with respect to an optical axis 170.

First, second, third, and fourth LCPGs 102, 112, 132 and 142, respectively, may provide diffraction properties such as at least one diffracted orders (such as +1 or −1 order), substantially orthogonal circular polarizations of the non-zero orders, and/or highly polarization-sensitive non-zero-orders, which may be linearly proportional to the Stokes parameter of the LCPGs. For example, the LCPGs may be polymerized LC films including anisotropic periodic molecular structures with birefringence patterns configured to diffract light incident thereon with a diffraction efficiency of 50% or greater. Each one of first, second, third, and fourth LCPGs 102, 112, 132 and 142, respectively, may include multiple layers having periodic local anisotropy patterns that are offset relative to one another to define a phase modification therebetween and/or rotated by a twist angle over respective thicknesses thereof. Additionally, one or more of such multiple layers may be an actively switchable liquid crystal layer such that the LCPG acts as a switchable liquid crystal polarization grating.

First, second, third, and fourth LCPGs 102, 112, 132 and 142, respectively, may be identical in type, thickness, periodicity, and/or molecular orientation, or one or more of the LCPGs may have a characteristic distinct from the other LCPGs in LC beam steering device 100. Furthermore, first, second, third, and fourth LCPGs 102, 112, 132 and 142, respectively, may be arranged in parallel or antiparallel orientation with respect to each other.

Figure 2:
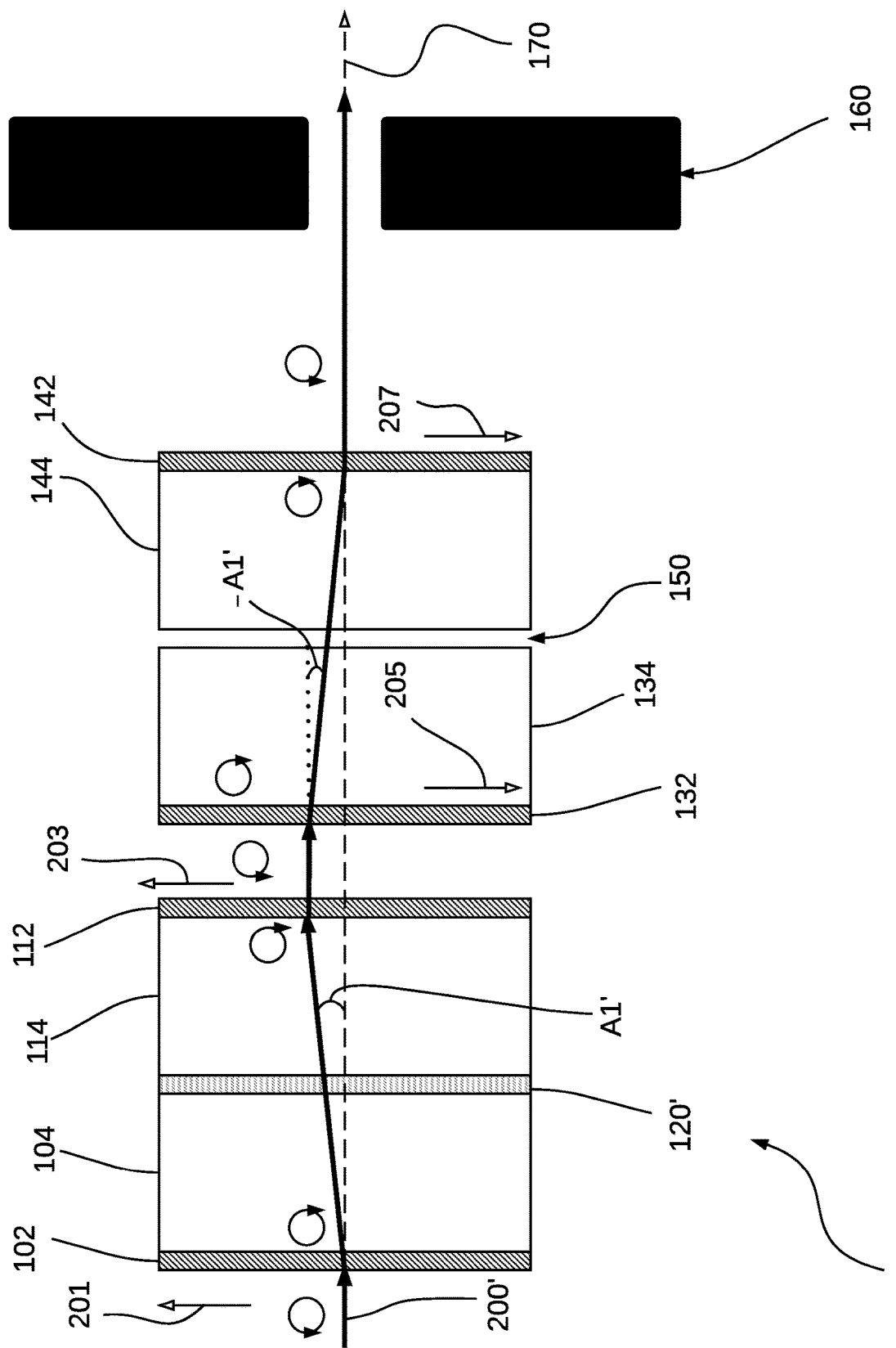
FIGS. 2 and 3 collectively illustrate the beam paths of light transmitted through the LCPG beam steering device of FIG. 1.
Figure 3:
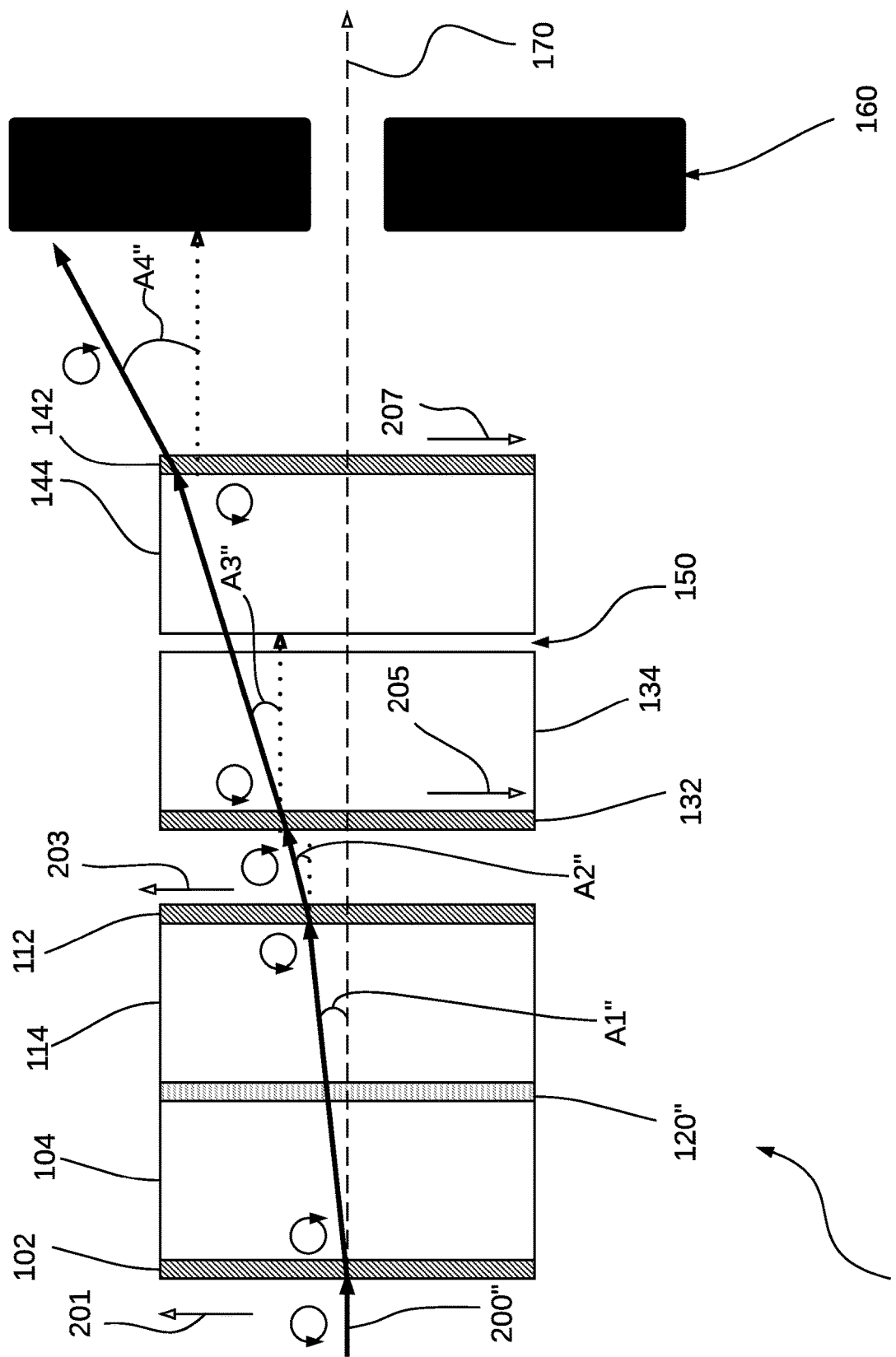

The operation of an exemplary embodiment of LC beam steering device 100 is illustrated in FIGS. 2 and 3. In FIG. 2, LC switch 120' is in a first state, in which a first retardance is introduced to light traveling through the LC switch (retardance can also be referred to as a phase modification between polarizations of light passing through the LC switch 120). In FIG. 3, LC switch 120" is in a second state, in which a second retardance is introduced to light traveling through the LC switch. In the exemplary embodiment illustrated in FIGS. 2 and 3, first and second LCPGs 102 and 112, respectively, are arranged in a parallel orientation (as indicated by arrows 201 and 203), and third and fourth LCPGs 132 and 142, respectively, are also arranged in a parallel orientation (as indicated by arrows 205 and 207). In the illustrated example, the orientation of the pair formed by first and second LCPGs 102 and 112, respectively, is antiparallel to the orientation of the pair formed by third and fourth LCPGs 132 and 142, respectively. It is assumed throughout the description of the exemplary embodiment in FIGS. 2 and 3 that the diffractive properties, such as the grating pitch and thickness, of first, second, third, and fourth LCPGs 102, 112, 132, and 142, respectively, are essentially identical. However, in some cases, the diffractive properties of the first, second, third, and fourth LCPGs 102, 112, 132, and 142 can be substantially similar. While the diffractive properties can be the same or similar, the orientations of one or more of the LCPGs can be antiparallel.

As shown in FIG. 2, a light beam 200' is incident on first LCPG 102 along optical axis 170. Light beam 200' is characterized by a first polarization state. For instance, light beam 200' may be characterized by right-hand circular polarization. However, in other embodiments, the incident light beam 120 can be unpolarized, elliptically polarized, or have some other polarization state. When any but circularly-polarized light is incident on the first LCPG 102, two beams will emerge from the first LCPG 102.

Upon transmission therethrough, first LCPG 102 diffracts light beam 200' by an angle A1' with respect to optical axis 170, and the polarization state of light beam 200' is flipped to left-hand circular polarization. LC switch 120' is in a first state, which introduces a first retardance to light beam 200' upon transmission therethrough. For example, the first retardance may be a full-wave retardance; in this case, light beam 200' remains left-hand circularly polarized when incident on second LCPG 112. However, any multiple of a full wave, or λ can be imparted by the LC switch 120' in this first state. Said another way, in the first state, the LC switch 120', along with any trim retarders, can impart a retardance of nλ, where n can be selected from the set of integers as well as 0. Assuming the first state imparts a multiple of a full-wave retardance to the beam 200', and since LCPG 112 is oriented in parallel to first LCPG 102, second LCPG 112 then diffracts light beam 200' to propagate substantially parallel to optical axis 170, while flipping the handedness of the polarization state such that light beam 200' emerging from second LCPG 112 is again right-circularly polarized.

Light beam 200' is then incident on third LCPG 132. As third LCPG 132 is oriented in an antiparallel manner with respect to first and second LCPGs 102 and 112, light beam 200' is diffracted at an angle—A1'. The polarization state of light beam 200' is once again flipped such that light beam 200' emerging from third LCPG 132 is again left-circularly polarized.

Light beam 200' is subsequently transmitted through space 150 with its left-circular polarization intact until it is incident on fourth LCPG 142. Fourth LCPG 142, being parallel in orientation to third LCPG 132, diffracts light beam 200' back in alignment with optical axis 170 and with right-hand circular polarization such that light beam 200' is subsequently transmitted through aperture 160.

Turning now to FIG. 3, a light beam 200" with right-hand circular polarization is incident on first LCPG 102. First LCPG 102 diffracts light beam 200" again at an angle A1' and flips the polarization to a left-hand circular polarization. This time, LC switch 120" is in a second state such that light transmitted therethrough experiences a second retardance. The second retardance may be, for instance, a half-wave retardance; in this case, light beam 200" experiences a half-wave retardance during transmission through LC switch 120" such that light beam 200" is characterized by a right-hand circular polarization and consequently diffracted by second LCPG 112 at an angle A2", which is larger than angle A1'. The handedness of the polarization of light beam 200" again is flipped upon diffraction by second LCPG 112 such that the light beam emerging from second LCPG 112 is left-hand circularly polarized. In other embodiments, the LC switch 120" in this second state, along with any trim retarders, can impart any $$m + \frac{\lambda}{2}$$

retardance to the light beam 200", where m can be selected from the set of integers as well as 0.

Since third LCPG 132 is in an antiparallel orientation with respect to first and second LCPGs 102 and 112, respectively, light beam 200" is further diffracted to an angle A3", which is larger than angle A2", upon transmission through third LCPG 132. Light beam 200" then propagates through space 150 with right-hand circular polarization, then is further diffracted by fourth LCPG 142 into an angle A4", which is still larger than angle A3", with left-hand circular polarization. Finally, light beam 200" emerging from fourth LCPG 142 can be blocked by aperture 160. If, for instance, the aperture is instead an implicit aperture, as previously discussed, light beam 200" does not enter the optical component or system located further along optical axis 170 from fourth LCPG 142.

For the exemplary embodiment illustrated in FIGS. 1, 2, and 3, in other words, light beam 200 is transmitted through aperture 160 when LC switch 120 is in a first state, and light beam 200 is blocked by aperture 160 when LC switch is in a second state. In other embodiments, the system 100 can be arranged such that switching the LC switch 120 results in a partial transmission or blocking of the light beam 200. For instance, when the LC switch 120 is in a first state, the light beam 200 may be at least partially transmitted through the aperture 160, while the light beam 200 may be at least partially blocked by the aperture 160 when the LC switch 120 is in a second state. As a further example, the LC switch 120 in a first state, either in combination with one or more trim retarders, may impart other than a multiple of a full wave of retardance to the light beam 200'. For instance, in a first state (e.g., an "off" state) the LC switch 120' plus one or more trim retarders or other retarding mechanisms can apply a retardance or phase modification of $$\frac{\lambda}{10}$$

waves to the light beam 200' between LCPG 102 and LCPG 112. The result would be a slight change in the polarization of the light beam 200 that causes an output light beam 200' to split into two components of different powers, one following the path shown in FIG. 2, and one following the path shown in FIG. 3. In this way, the first state of the LC switch 120' can result in some attenuation of the light beam 200', although this attenuation is not equal to nor comparable to the attenuation seen when the LC switch 120' is in a second (e.g., an "on" state) that imparts a multiple of a half wave of retardance.

Similarly, a second state of the LC switch, either alone or in combination with one or more trim retarders, may impart other than a multiple of a quarter wave retardance to the light beam 200". In this way, the light beam 200" changes polarization between LCPG 102 and LCPG 112 (sees a phase modification between polarizations or a retardance), but does not undergo a full 90° or quarter-wave change in polarization. Rather, the retardance can be close to a 90° or quarter-wave retardance, but not equal thereto. The result, is that the second state of the LC switch 120" results in less than full attenuation at the aperture 160. In other words, if the system 100" is spaced and sized appropriately, the second state of the LC switch 120" can result in some portion of the light beam 200" passing through the aperture 160.

In another embodiment, a first state of the LC switch 120' results in an entirety of the light beam 200' passing through the aperture 160, while a second state of the LC switch 120" results in some, but not all of the light beam 200", passing through the aperture 160. A third state of the LC switch 120, between the first and second states of the LC switch 120, results in some portion of the light beam 200 passing through the aperture 160, where this portion is larger than that transmitted given the first state of the LC switch 120', yet smaller than that transmitted given the second state of the LC switch 120". Third, fourth, fifth, etc. states of the LC switch 120 can also be implemented in order to increase the selectivity of transmission amounts through the aperture 160.

These examples show that the LC switch 120 may have intermediate states that result in less than a maximum contrast between first and second states, or off and on states. Alternatively, there may be more than two states, and thereby variable attenuation can be achieved.

In one embodiment, such variable attenuation can be accomplished through an AC bias applied to the LC switch 120, where the AC bias is configured to apply a variety of AC biases to switch the LC switch 120 between various states between and including the first and second states. Different biases result in a different level of alignment within the LC switch 120 and hence different amounts of retardance can be imparted to the light beam 120. In other words, the attenuation of the light beam 120 can be a function of the AC bias applied to the LC switch 120. In an embodiment, the AC bias applied in either the first or second state is 0V. In another embodiment, the AC bias for both the first and second state can be greater than 0V.

Returning briefly to FIG. 1, it should be noted that the distances D1 and D2 are strategically determined to achieve the appropriate performance by LC beam steering device 100. In one example, assuming the material composition and thicknesses of first, second, third, and fourth substrates 104, 114, 134, and 144 are essentially identical (i.e., essentially identical indices of refraction), then distances D1 and D2 may be set to be equal if the refractive indices of the materials comprising LC switch 120 and space 150 are similar. If the thicknesses of LC switch 120 and space 150 are small compared to the thickness of the substrates, as is likely in a practical implementation, the precision required of the refractive index match between LC switch 120 and any material contained within space 150 may be reduced. Such a setting may be achieved, for example, by using the same spacer arrangement (not shown) in setting the thicknesses of both LC switch 120 and space 150. Suitable spacer arrangements may include, for example, the use of spacer beads or spacer rods suspended in optical adhesive. Further, the above-mentioned relationship of D1 and D2 assumes that bonding layers such as glues, have a negligible effect on beam steering. Where such layers do have a noticeable effect on beam steering, their influence can be factored into the relationship between D1 and D2.

In a further refined calculation, the angles of deviation of the gratings and the propagation through multiple layers are "balanced" so that the light beam, in the transmitting state, is correctly returned to the optical axis. This calculation is performed by tracing a ray through the stack and evaluating the result of refraction at layer boundaries using Snell's law. Such a holistic, optical system view of the LC beam steering device allows the inclusion of manufacturability considerations into the device design, thereby greatly increasing the configuration flexibility of the entire system. We have recognized that factoring manufacturability and LC and LCPG material issues into the LC beam steering device design is essential to the implementation of a practical and consistently manufacturable devices with superior SWaP characteristics.

As an example, setting D1=D2, as shown in FIGS. 1-3, may be useful such that, light beam 200 may be inserted into LC beam steering device 100 along optical axis 170 and subsequently exit through aperture 160 again along optical axis 170 when LC switch 120 is in a first state, as shown in FIG. 2. This choice of setting D1=D2 assumes that the refractive index of substrates 104, 114, 134, and 144 as well as the refractive indices of LC switch 120 and any material contained within space 150 are substantially the same at the wavelength of interest or, if a layer has a significantly different refractive index, its thickness is sufficiently small so as to not displace the beam too far (e.g., bonding layers such as glues or optical fillers). Additionally, manufacturing tolerances can cause small changes in D1 and D2 that do not cause untenable beam displacement. The allowed tolerances can depend on beam diameter and other factors, but, for instance, the inventors found that given 700 µm thick substrates 104, 114, 134, 144 having manufacturing tolerances of +/−50 µm each, the influence on beam displacement of these small divergences from D1=D2 were acceptable. Given smaller beam diameters, smaller tolerances may be preferred. Thus, one could say that D1=D2 within the bounds of manufacturing tolerances for a given application (e.g., given a certain beam diameter among others).

Additionally, setting D1=D2, in the system 100, enables a single type LCPG to be used for all four LCPGs 102, 112, 132, 142. In other words, from a manufacturing standpoint, setting D1=D2 enables a single type of LCPG having singular parameters to be used for all four of the LCPGs 102, 112, 132, 142 in the system 100. For instance, the same manufacturing setup can be used for all four LCPGs 102, 112, 132, 142 (e.g., two or more of the LCPGs 102, 112, 132, 142 can be formed on the same substrate). Alternatively, a large LCPG can be made, and many small gratings can be formed therefrom by cutting the large LCPG with a dicing saw or scribe-and-break system. The use of four identical, or nearly-identical, LCPGs provides cost and manufacturing advantages over three-grating systems, where each LCPG would need to be different.

Another advantage of the four-grating system 100 is enhanced contrast ratio or dynamic range as compared to three-grating systems. Komanduri et al. (*A High Throughput Liquid Crystal Light Shutter for Unpolarized Light Using Polymer Polarization Gratings*; Acquisition, Tracking, and Laser Systems Technologies XXV, Proc. of SPIE Vol. 8052, 2011) discuss a three-grating system for use in displays and describes contrast ratios as high as 230:1. The herein disclosed four-grating system is able to achieve much higher contrast ratios including those greater than 1000:1.

Alternatively, D1 and D2 may be set to be purposefully unequal such that light beam 200 emerges at an off-axis angle or off-set from optical axis 170. Such embodiments may be useful in certain system configurations that require off-axis inputs and/or outputs.

Figure 4:
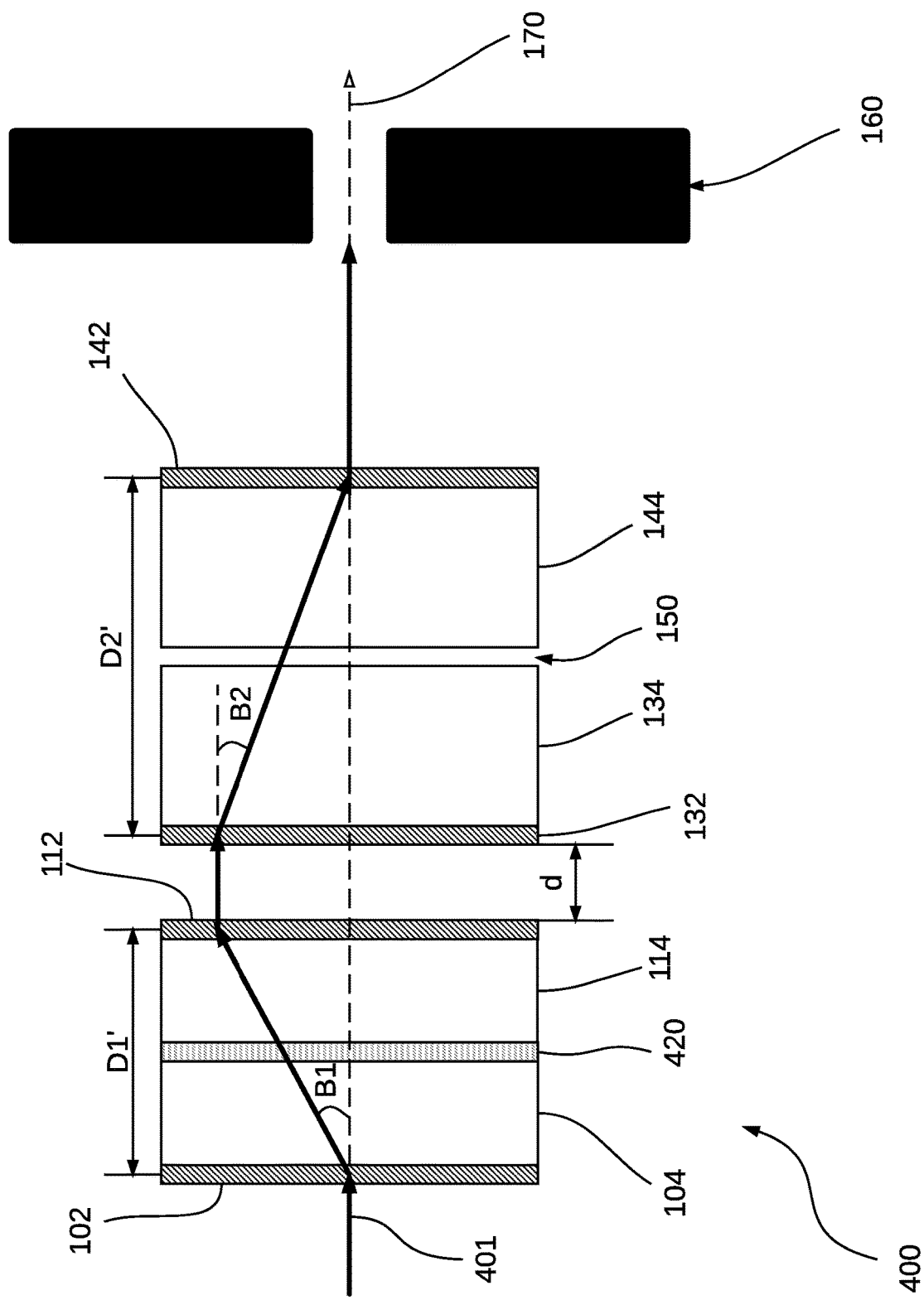
FIG. 4 illustrates a LCPG beam steering device including an LC polarization switch, in accordance with another embodiment of the present disclosure.

FIG. 4 shows another variation in which first and second LCPGs 102 and 112, respectively, may be a matched pair sharing substantially similar periodic birefringence patterns, while third and fourth LCPGs 132 and 142, respectively, are another matched pair sharing substantially similar periodic birefringence patterns with respect to each other, although different from the periodic birefringence patterns of first and second LCPGs 102 and 112, respectively. For a light beam 401 incident on LC beam steering device 400 along optical axis 170, the corresponding D1' and D2' values are related by the beam propagation angles B1 and B2 so that:

$$D1'*\sin(B1)+D2'*\sin(B2)=0 \qquad \text{Eq. (1)}$$

One of skill in the art will recognize that optical tolerances of up to 10% are common, and therefore, tolerances of up to around 10% in D1' and D2' are acceptable without departing from Eq. (1). For instance, a thickness of the liquid crystal switch (e.g., 3 µm) 420 is unlikely to have a noticeable effect on Eq. (1) in many use cases. For instance, where the substrates 104, 114, 134, 144 are around 700 µm in thickness, nominal changes in thickness (e.g., +/−30 µm), for instance, that of LC switch 420, the space 150, and the thicknesses of the LCPGs 102, 112, 132, 142, are unlikely to have a noticeable effect on Eq. (1). Tolerances of D1' and D2' may depend on incident beam diameter: wider beams may suggest greater tolerance, while narrower beams may suggest lesser tolerance. In other words, various manufacturing tolerances on D1' and D2' are envisioned, and those of skill in the art will be able to apply Eq. (1) given acceptable tolerances for a given application. The angles shown in this figure illustrate the situation in which the refractive indices of LC switch 420 and any material contained within space 150 are similar to that of first, second, third, and fourth substrates 104, 114, 134, and 144, respectively.

Figure 5:
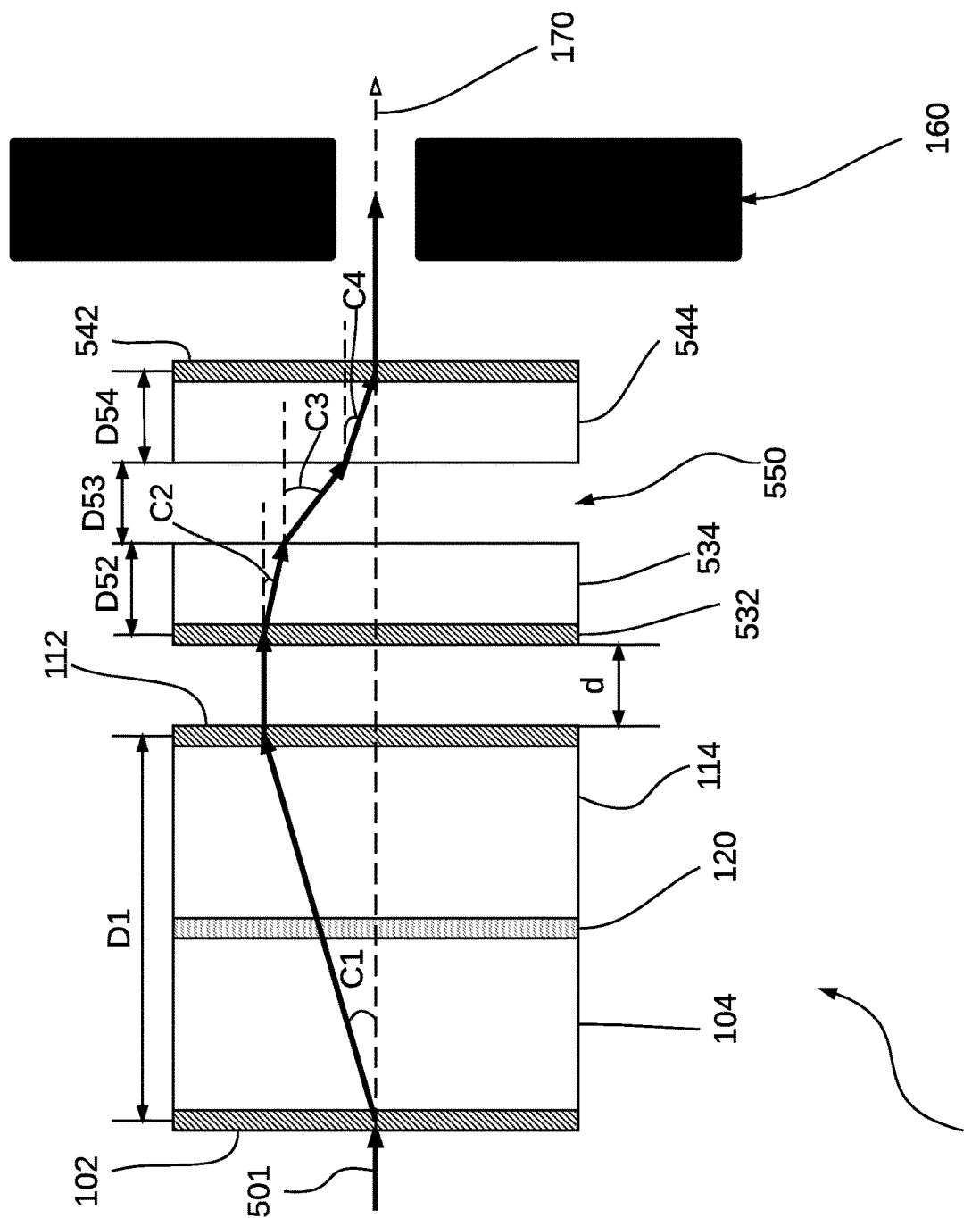
FIG. 5 illustrates a LCPG beam steering device including an LC polarization switch, in accordance with yet another embodiment of the present disclosure.

FIG. 5 illustrates another exemplary embodiment, in which thickness D52 of third substrate 534, thickness D53 of space 550, and thickness D54 of fourth substrate 544 are set to be significantly different from each other and distance D1. Diffractive angles are traced through media of different refractive indices. In this example, a light beam 501 is first deflected at first LCPG 102 up to an angle C1, at which it propagates for distance D1. Upon encountering second LCPG 112, light beam 501 is then redirected to a direction substantially parallel to the optical axis. Light beam 501 then propagates for distance d until it encounters a third LCPG 532, at which point light beam 501 is then directed down to an angle C2 for propagation distance D52 through a third substrate 534. In this example, the material in a space 550 is assumed to have a lower refractive index than that of substrate 534, so light beam 501 deviates further down to an angle C3 as it propagates for distance D53 through space 550. Light beam 501 is then incident on a fourth substrate 544 which causes a refraction to an angle C4. It may be noted that, if third substrate 534 and fourth substrate 544 are formed of different materials, then angles C2 and C4 would not be equal. Finally, a fourth LCPG 542, causes a deflection of the beam back parallel to optical axis 170. Snell's law may be used to determine the angle of propagation after the transition into a new medium such as from substrate 534 to space 550.

In the situation which is shown in FIG. 5, which has the exit aperture positioned on-axis with respect to optical axis 170, the deflection angles and distances should be chosen so that:

$$D1*\sin(C1)+D52*\sin(C2)+D53*\sin(C3)+D54*\sin(C4)=0 \quad \text{Eq. (2)}$$

In this way, a variety of material and thickness configurations may be accommodated to achieve an effective and practical device design. Again, manufacturing tolerances appropriate for the use case are envisioned relative to the distances specified in Eq. (2).

Figure 6:
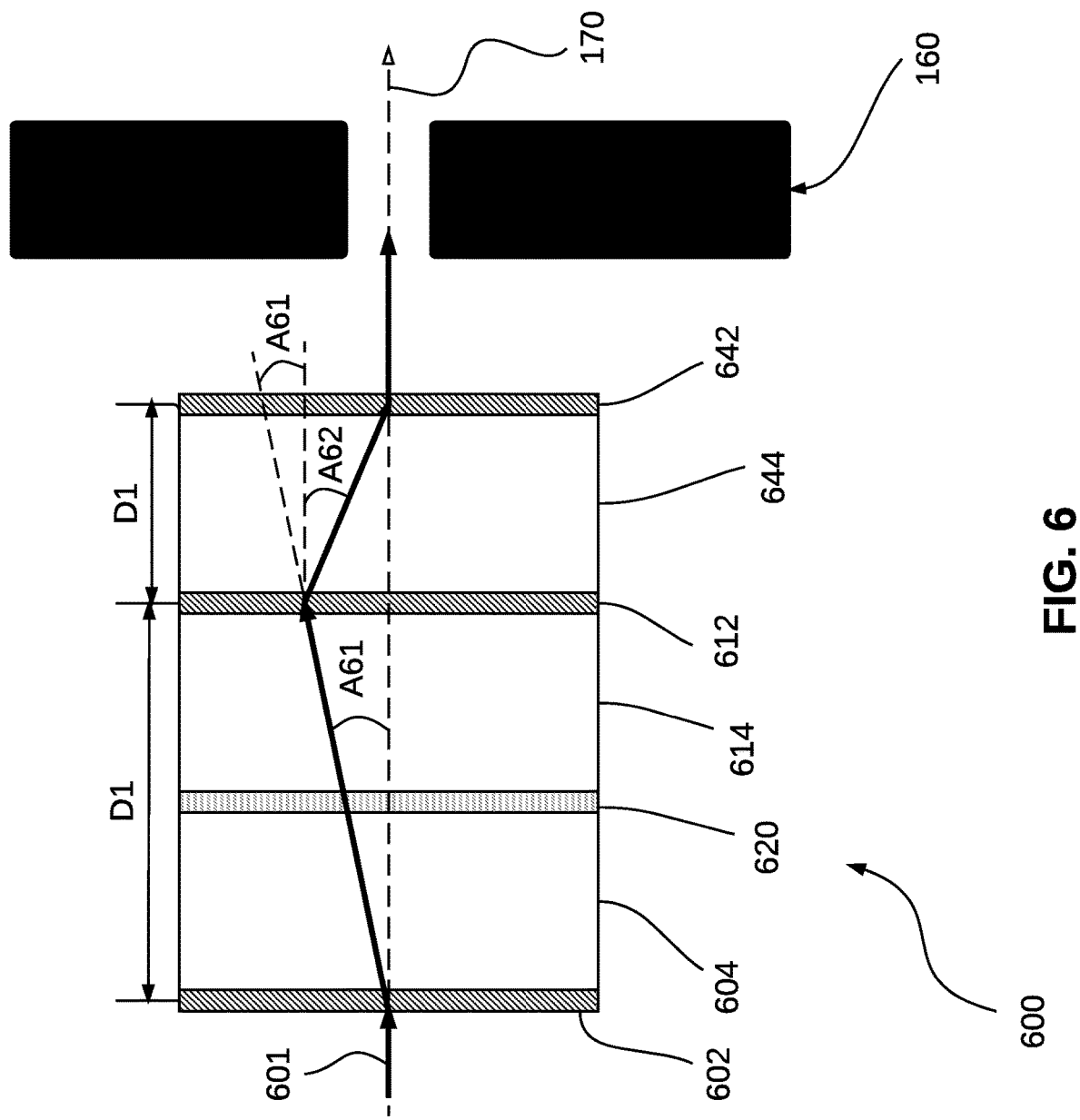
FIG. 6 illustrates a LCPG beam steering device including an LC polarization switch, in accordance with yet another embodiment of the present disclosure.

In yet another variation the functions of the third and fourth polarization gratings, above, may be combined into a single LCPG, as illustrated in FIG. 6. In this exemplary embodiment, a first LCPG 602 deflects a light beam 601 to an angle of A61. The beam then passes through a LC switch 620, which may "flip" the polarization state to the orthogonal handedness, depending on the state of the liquid crystal material contained therein. A second LCPG 612 may be configured such that light beam 601 may be deflected back towards optical axis 170. Finally, light beam 601 is brought back into alignment with the optical axis by a third LCPG 642. In this configuration, the diffractive properties of first, second, and third LCPGs 602, 612, and 642, respectively, are chosen so that the resulting deflection angles are related by the following equation:

$$D61*\sin(A61)+D62*\sin(A62)=0 \quad \text{Eq. (3)}$$

Note that the magnitude of the deflection angle effected by second LCPG 612 is equal to the sum of the magnitudes of A61 and A62, and the deflection effected by third LCPG 642 is equal in magnitude to A62. Again, manufacturing tolerances appropriate for the use case are envisioned relative to the distances specified in Eq. (3).

In yet another variation, the LC switch may be switched between two states that are separated by approximately a half wave of retardance, with the values of retardance chosen for reasons of LC switching speed, convenience of cell assembly, drive voltage range, or a combination of these factors. For example, the LC cell could be an untwisted electrically-controlled birefringence ("ECB") cell configured to switch between a high-voltage state, with a retardance of less than a quarter-wave, and a low-voltage state, with a retardance approximately one half-wave greater. One or more retarders, external to the LC cell, may be added to "trim" the effective retardance of the ECB cell such that, in one of the LC cell's states, the light's polarization is substantially unaltered and, in the other state, the light's polarization is changed to the orthogonal circular polarization state.

Figure 7:
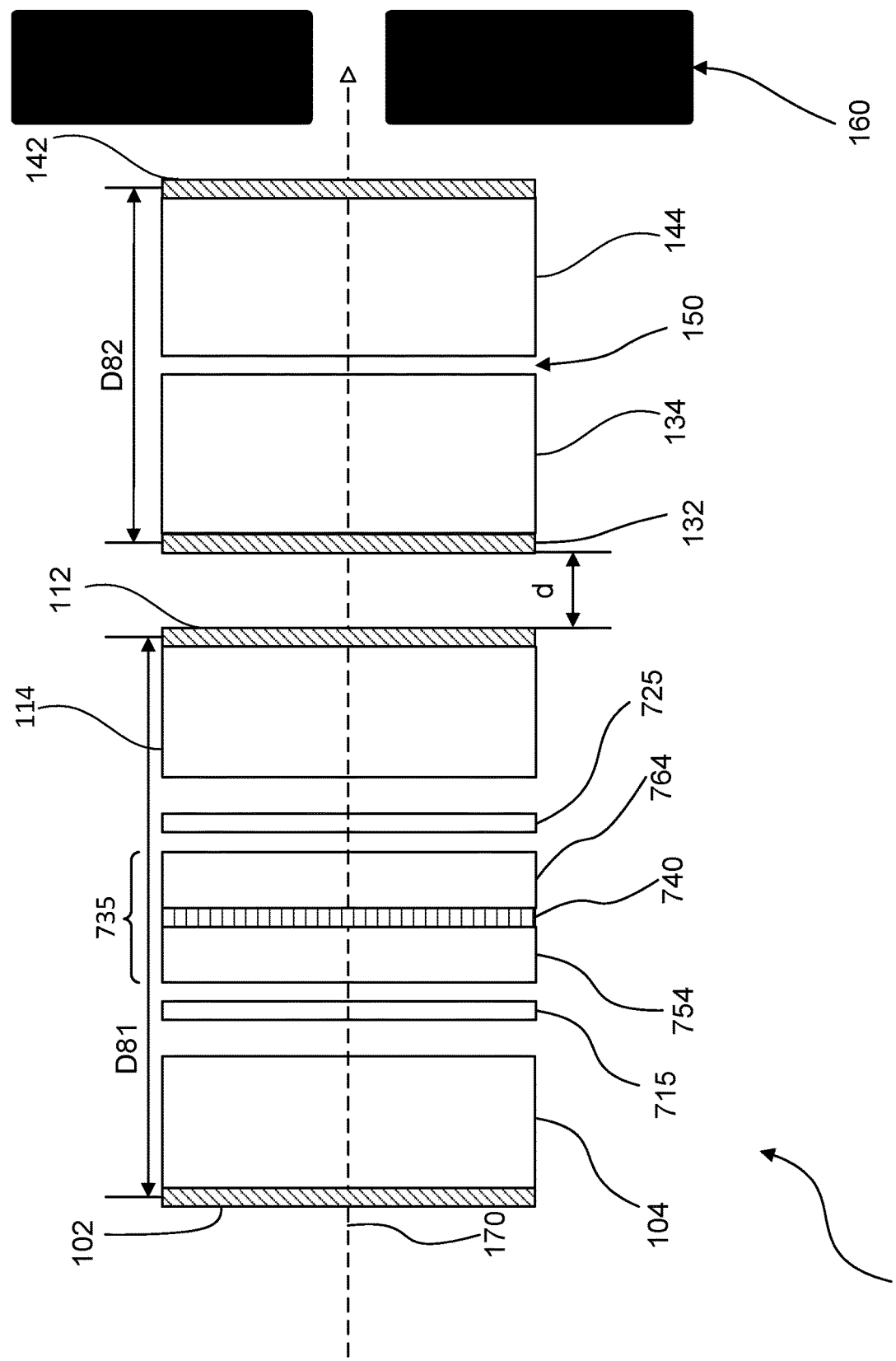
FIG. 7 illustrates a LCPG beam steering device including an LC polarization switch and trim retarders, in accordance with another embodiment of the present disclosure.

An example of an ECB cell implementation of an LC beam steering device is shown in FIG. 7. FIG. 7 shows a LC beam steering device 700 including first, second, third, and fourth LCPGs 102, 112, 132, and 142, respectively, supported on first, second, third, and fourth substrates 104, 114, 134, and 144, respectively. Rather than having an LC switch supported between first and second substrates 104 and 114, respectively, a combination of elements are supported between first and second substrates 104 and 114. As shown in FIG. 7, a first trim retarder 715 and an optional second trim retarder 725 is/are placed on either side of an ECB cell 735. ECB cell arrangement includes fifth and sixth substrates 754 and 764, respectively, supporting a liquid crystal layer 740 therebetween.

In an exemplary embodiment, first trim retarder 715 or the combination of first and second trim retarders 715 and 725, respectively, may be chosen to compensate for any residual retardance of ECB cell 735 so the combination of ECB cell 735, in one state, and trim retarder(s) leaves the incident light's polarization substantially unaffected. For instance, ECB cell 735 may be configured and driven to a high or first voltage for one if its switched states. If, in this high or first voltage state, the residual retardance of ECB cell 735 is 80 nm, as an example, then first trim retarder 715 may be selected to exhibit a retardance of 80 nm at the wavelength of interest and second trim retarder 725 may be eliminated from LC beam steering device 700. First trim retarder 715 may be oriented, for example, with its in-plane slow-axis at 90 degrees to an in-plane slow-axis of ECB cell 735. This choice of orientation results in the residual retardance of ECB cell 735 and the retardance of first trim retarder 715 cancelling each other such that the polarization state of the light transmitted through the combination of first trim retarder 715 and ECB cell 735, in the high or first voltage state, is essentially unaltered.

First and second trim retarders 715 and 725 may be formed, for instance, by combining a plurality of retarders in order to obtain the required retardance value to cancel out the residual retardance of the particular ECB cell selected to be used within the system. Continuing the previous example, if it proves inconvenient to purchase or make 80 nm retarder material, it may be more convenient to acquire retarders of other values and combine them appropriately. For instance, a retarder of 350 nm could be crossed with (i.e., oriented at 90 degrees to) a retarder of 270 nm to yield a composite retarder of 80 nm. Similarly, a retarder of 30 nm could be additively combined with a retarder of 50 nm to achieve a composite retarder of 80 nm, by combining them with their slow axes in parallel. If the trim retarder is made from two or more separate parts, these component parts may be placed on either or both sides of ECB cell 735 as first and second trim retarders 715 and 725, respectively.

Alternatively, it may be convenient to use a trim retarder arrangement that modifies the combined retardance of the assembly to a value that does change the polarization state of the incident light when ECB cell 735 is in the high or second voltage state. For instance, if ECB cell 735 exhibits a residual retardance of 80 nm in the high or second voltage state and the wavelength of interest is 500 nm, then it may be convenient to trim the cell from 80 nm to 250 nm by using a first and/or second retarder 715 and 725, respectively, with an effective trim retardance of 170 nm. The value of the low or first voltage may then be chosen such that ECB cell 735 exhibits a retardance of approximately 330 nm in the low or first voltage state, so that the retardance of the combined ECB cell and trim retarder arrangement would be approximately 500 nm (i.e., one wave at the wavelength of interest). In this case, the high voltage state (or second state) of ECB cell 735 would flip the polarization state of the incident light, and the low voltage state (or first state) would leave the polarization state of the incident light substantially unchanged, thus resulting in different beam propagation paths through LC beam steering device 700.

There are a variety of ways to arrange the combination of ECB cell and trim retarder(s) to provide the required switching function. The appropriate switching function may be achieved with a configuration that provides a combined retardance approximately equal to an even number of half-waves in one state of the ECB cell, and an odd number of half-waves in the other state of the ECB cell. The choice of components will depend on the relative importance of engineering factors, such as switching speed, available voltage, temperature range requirements, manufacturing cost and availability of retarders at the desired retardance values.

In another variation, ECB cell 735 in FIG. 7, may be replaced with a pi cell (also known as an Optically Compensated Bend cell) (See, for example, P. J. Bos and K. R. Koehler-Beran, Mol. Cryst. Liq. Cryst. 113, 329 (1984)). This alternative may be a good choice of LC configuration for applications requiring sub-millisecond switching speed, and is an example of an LC cell configuration that works well with a trim retarder. Although a pi cell may be constructed and driven between a half-wave and a full wave of retardance, one can obtain faster performance by driving between two states of lower retardance. Consequently, by combining a pi cell with one or more trim retarders, faster switching speeds may be obtained.

In yet a further variation, ECB cell 735 in FIG. 7, may be replaced with one or more ferroelectric liquid crystals (FLCs). This alternative may be a good choice of LC configuration for applications requiring greater speed than those using a pi cell. Each FLC is typically arranged to comprise a quarter-wave of retardance. The orientation of the FLC can be in-plane, oriented at an angle that depends on the state of an applied voltage to the FLC. The FLC material is selected to switch between two states separated by approximately 45 degrees. Thus, when two FLCs are used in combination and two states of a voltage are applied to the pair of FLCs, the combined FLCs can either add, to apply a half-wave of retardance if they are parallel, or subtract, to apply no retardance if they are oriented 90 degrees to each other.

While FLCs have been around for some time and were seen as having great potential for use in displays, they tend to produce patchy images when used in displays due to difficulties in achieving uniform alignment and their less-than-desired response to analogue switching inputs. Thus, FLCs are considered to have inherent disadvantages that make them unlikely contenders for switching applications. Yet, the inventors recognized that a much greater attenuation tolerance could be afforded in certain applications, such as where a single beam is being directed through an aperture. Unexpectedly, FLCs have application here despite their inherent disadvantages for switching applications.

Figure 8:
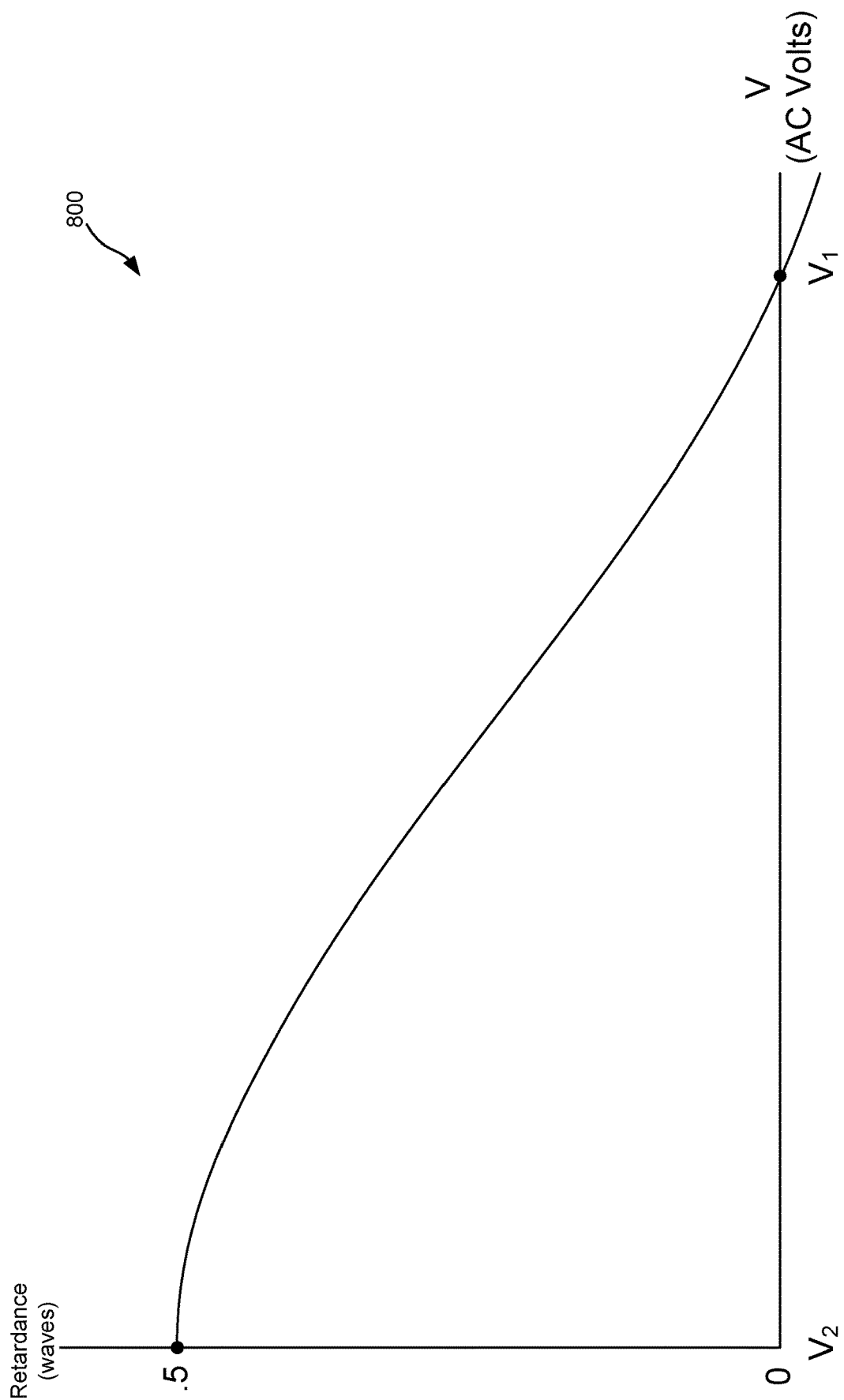
FIG. 8 illustrates a retardance versus voltage plot for an LC switch system that can be implemented in any of the herein-described embodiments.
Figure 9:
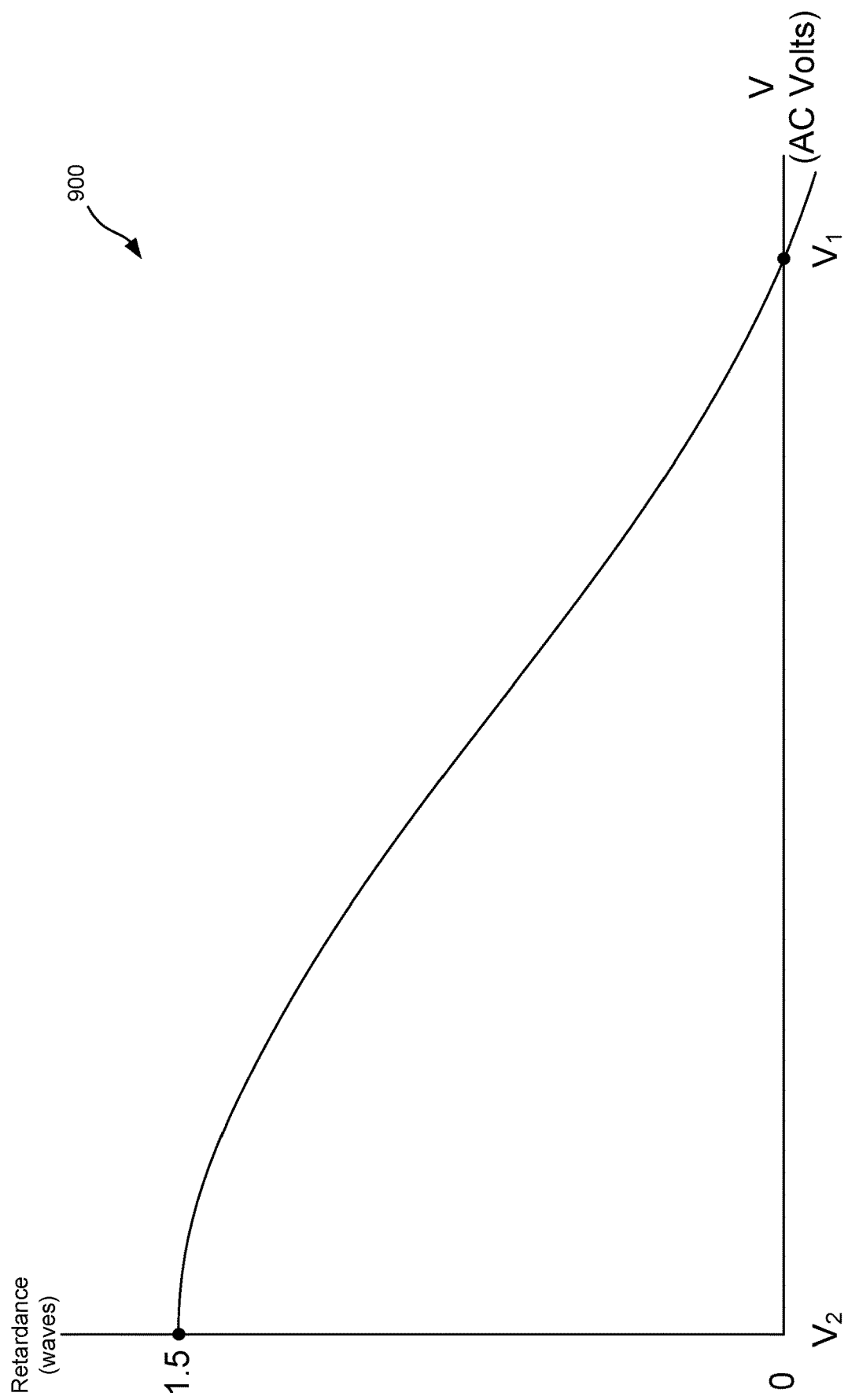
FIG. 9 shows another retardance versus voltage plot for a switchable phase modification system having different parameters than the system underlying FIG. 8.
Figure 10:
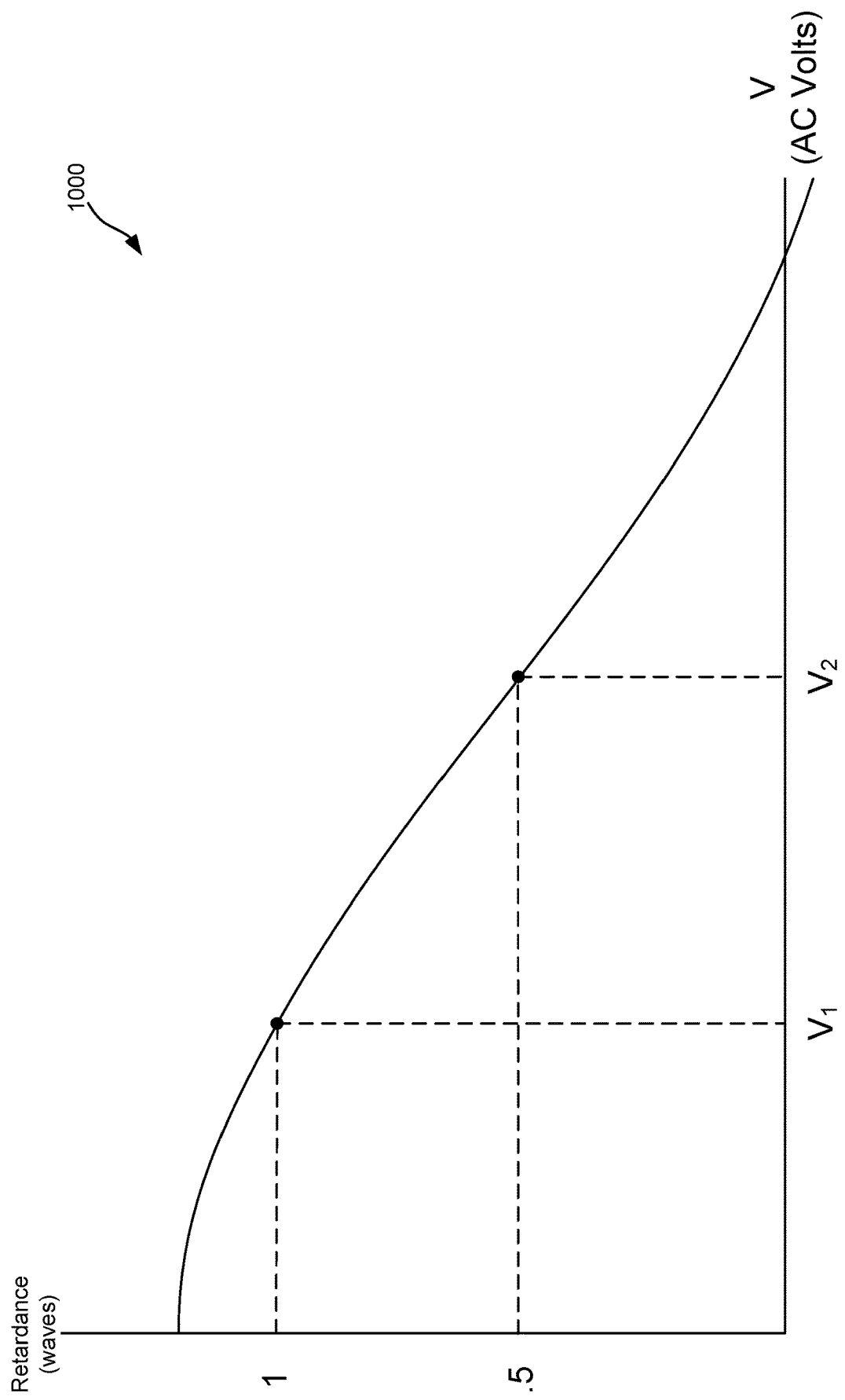
FIG. 10 shows another retardance versus voltage plot, but where the voltages for the first and second states are both positive and thus the LC switch can be said to be on for both states.

Turning back now to switching of the LC switch, a better understanding may be possible via reference to the following equations and FIGS. 8-10. Equation 4 represents a retardance imparted by any combination of one or more LC switches or LC layers, along with any one or more trim retarders in a second state (where the LC switch is on), where n is selected from the set of integers as well as 0 (i.e., the retardance of an even number of half wave retarders). Equation 5 represents a phase modification imparted by any combination of one or more LC switches or LC layers, along with any one or more trim retarders in a first state (where the LC switch is off), where m is selected from the set of integers as well as 0 (i.e., the retardance of an odd number of half wave retarders). For instance, an LC switch could impart a $2\lambda$ retardance in the first state, where n=2 or a $\lambda$ retardance in the first state, where n=1.

$$n\lambda \qquad \text{Eq. (4)}$$

$$m + \frac{\lambda}{2} \qquad \text{Eq. (5)}$$

FIGS. 8-10 show some different scenarios where equations 4 and 5 are used to explain or design a system of one or more LC switches, or one or more LC switches in combination with one or more trim retarders. In each figure a cumulative retardance of the one or more LC switches and optional one or more trim retarders is shown on the y-axis, while an AC voltage applied to the LC switch at a first state, $V_1$, and at a second state, $V_2$, are shown on the x-axis.

FIG. 8 illustrates a retardance versus voltage plot for an LC switch system that can be implemented in any of the above-described embodiments. The spline curve represents a retardance imparted by one or more LC switches, or one or more LC switches in combination with one or more trim retarders, for different AC voltages applied to the one or more LC switches. For simplicity, the one or more LC switches, or one or more LC switches in combination with one or more trim retarders will be referred to as a "switchable retardance system." One will recognize that in practice the voltage applied in a multi-LC-switch configuration may be more complicated than that shown since different voltages may be applied to each LC switch. However, for purposes of these illustrations, one can assume that the same voltage is applied to the one or more LC switches.

In a first state, a voltage $V_1$ is applied to the switchable retardance system, and a relative phase modification of 0 is imparted to light beams passing through the switchable retardance system. In a second state, no voltage is applied to the switchable retardance system, and a half wave, or $$\frac{\lambda}{2},$$

or retardance is imparted to any light beams passing through the switchable retardance system. In the second state, the retardance, $$\frac{\lambda}{2},$$

is the inherent or default retardance of the LC switch. A thickness and type of the one or more components in the switchable retardance system can dictate the shape of the curve and the spline's intersections with the x and y axes (although in some cases the curve does not intersect the x-axis due to residual retardance).

Figure 13:
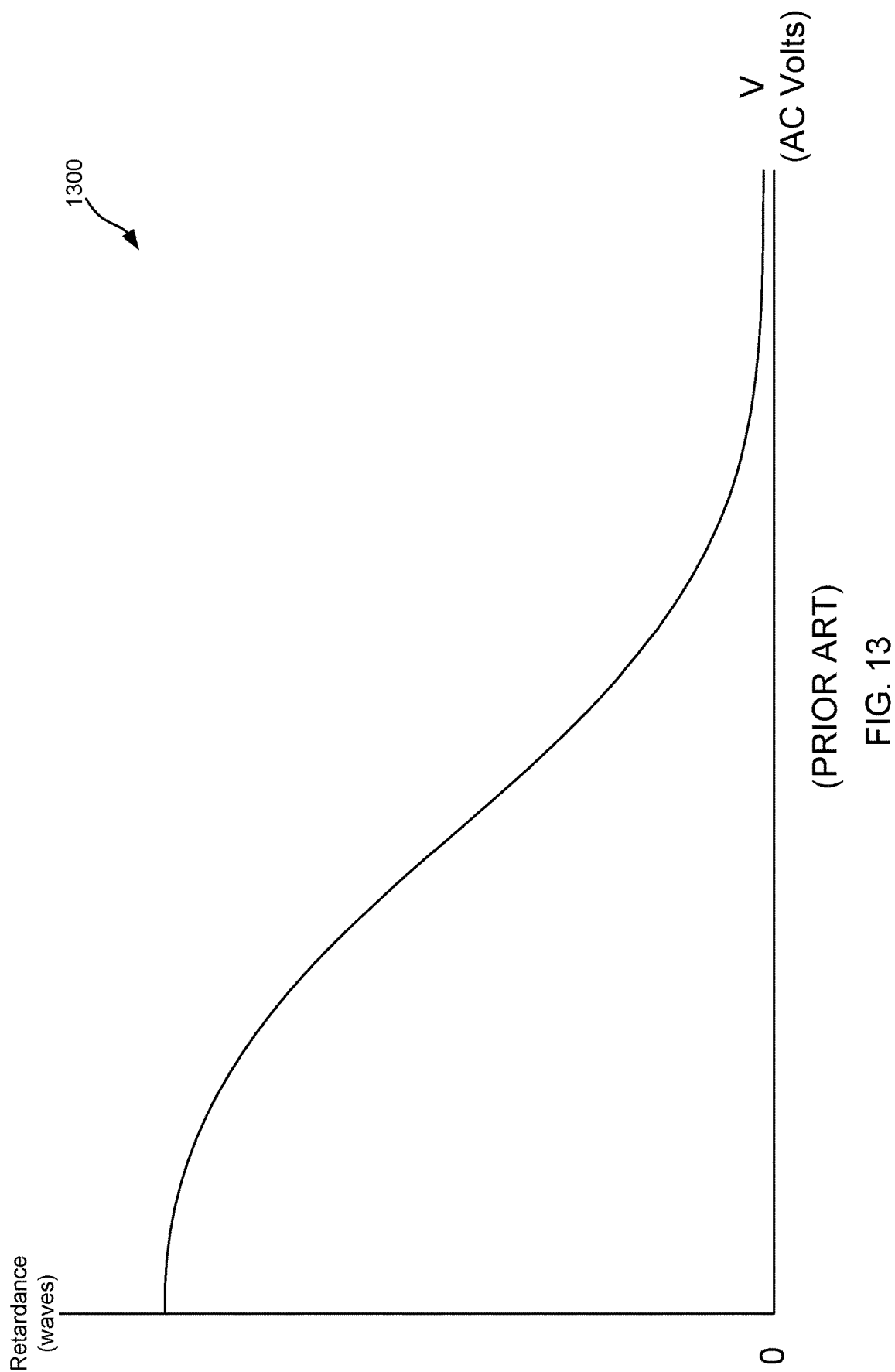
FIG. 13 illustrates a plot showing retardance as a function of a voltage applied to a LC switch in an LCPG system.

Typical LC switches are unable to impart a retardance of 0 due to residual retardance. Even at very large voltages, the retardance curve for most LC switches does not intersect the x-axis. Instead, an infinite voltage is required to apply zero retardance, and such a voltage is not practical. FIG. 13 shows the voltage versus retardance plot for such an LC switch.

One way to achieve a retardance of 0, as shown for the first state in FIG. 8, is to form a switchable retardance system comprising an LC switch and a trim retarder, where the trim retarder shifts the retardance curve of the LC switch seen in FIG. 13. The LC switch thickness can then be increased such that the spline curve's intersection of the y-axis still occurs at $$\frac{\lambda}{2},$$

as seen in FIG. 8. While this is one switchable retardance system that can achieve the plot in FIG. 8, this example shows that a variety of other switchable retardance systems can also achieve the plot in FIG. 8.

Further, FIG. 8 shows that switching between two applied AC voltages enables a switchable retardance system to impart either a half wave of retardance or no retardance, as shown in FIGS. 2-3. One can also see that by applying different voltages between $V_1$ and $V_2$ other retardances between 0 and a half-wave of retardance can be imparted. Thus, states other than the first and second state are also possible and therefore a variable tuning of the beam steering and attenuation is possible (see FIGS. 10-12).

FIG. 9 shows another retardance versus voltage plot for a switchable retardance system having different parameters than the system underlying FIG. 8. One can see that in the second state, the retardance is equal to three half waves, $$\frac{3}{2}\lambda,$$

which is effectively a half-wave retardance. In the first state, there is no retardance. As can be seen, the systems underlying FIGS. 8 and 9 impart the same effective retardance in the first and second states.

FIG. 10 shows another retardance versus voltage plot, but where the voltages for the first and second states are both positive and thus the LC switch can be said to be on for both states. Moreover, the two states do not correspond to a maximum and minimum retardance that can be imparted, as was the case in FIGS. 8 and 9. In this case, the second state applies a voltage greater than in the first state, and the retardance imparted by the second state is a half wave while the retardance imparted by the first state is a full wave. In some cases, LC switching is improved by using higher voltages, and thus configuring the switchable retardance system such that the first and second states both involve finite voltages, or greater than 0V, may enhance switching (e.g., make for faster LC switching). There may be other reasons for desiring to use non-zero bias voltages, so FIG. 10 demonstrates that the switchable retardance system can be configured to achieve this goal while still enabling a half-wave switching of polarization in a second state ($V_2$), and no change to the polarization in a first state ($V_1$).

Figure 11:
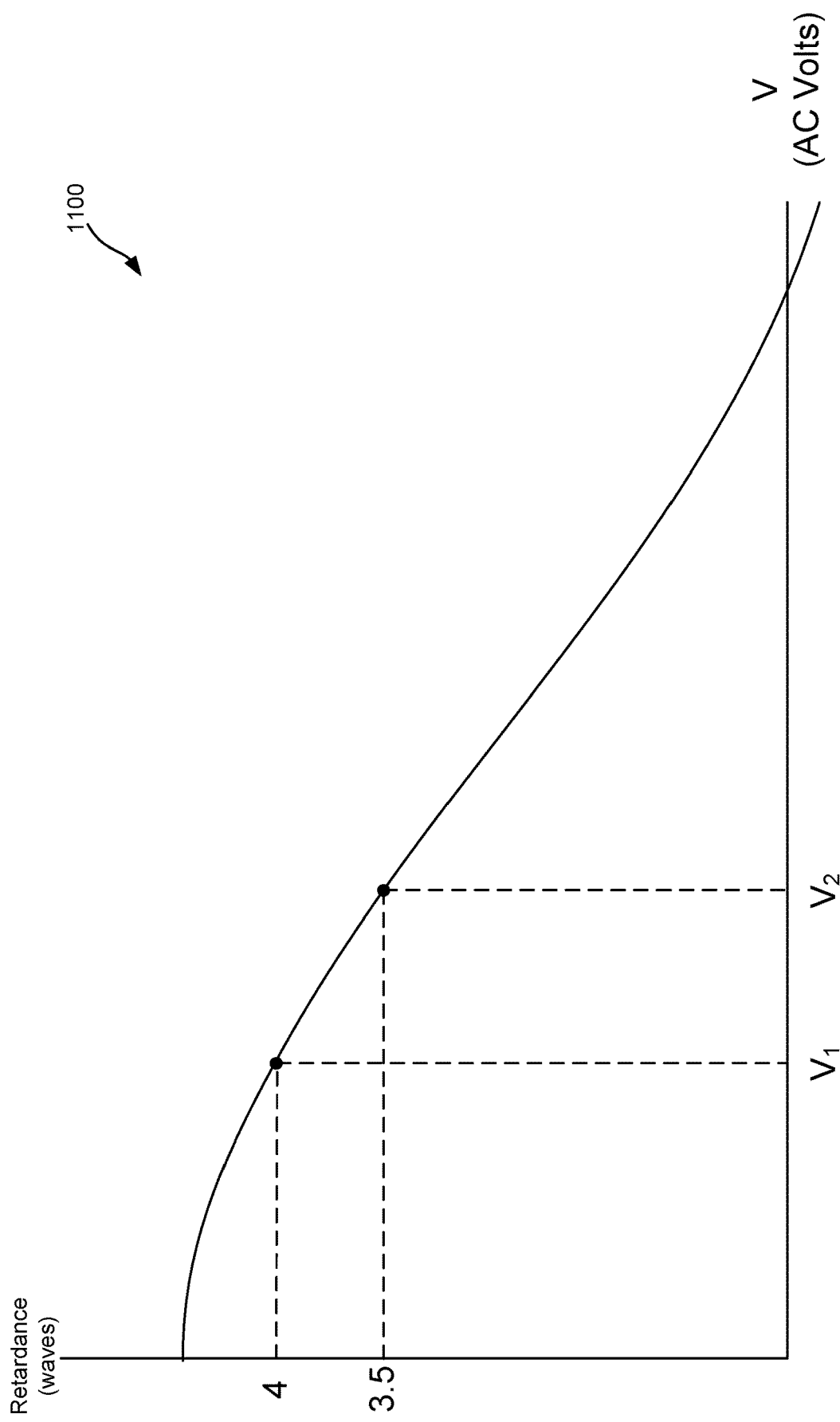
FIG. 11 shows another retardance versus voltage plot showing the results of using a higher retardance LC switch than that of FIG. 10.

FIG. 11 is a variation of FIG. 10 showing the results of a thicker LC switch. In particular, the retardance induced by the first state is 4λ, which effectively imparts no polarization change to the light beam, and the retardance induced by the second state is 3.5λ, which effectively flips the polarization of the light beam (e.g., changing right-hand circular to left-hand circular).

Figure 12:
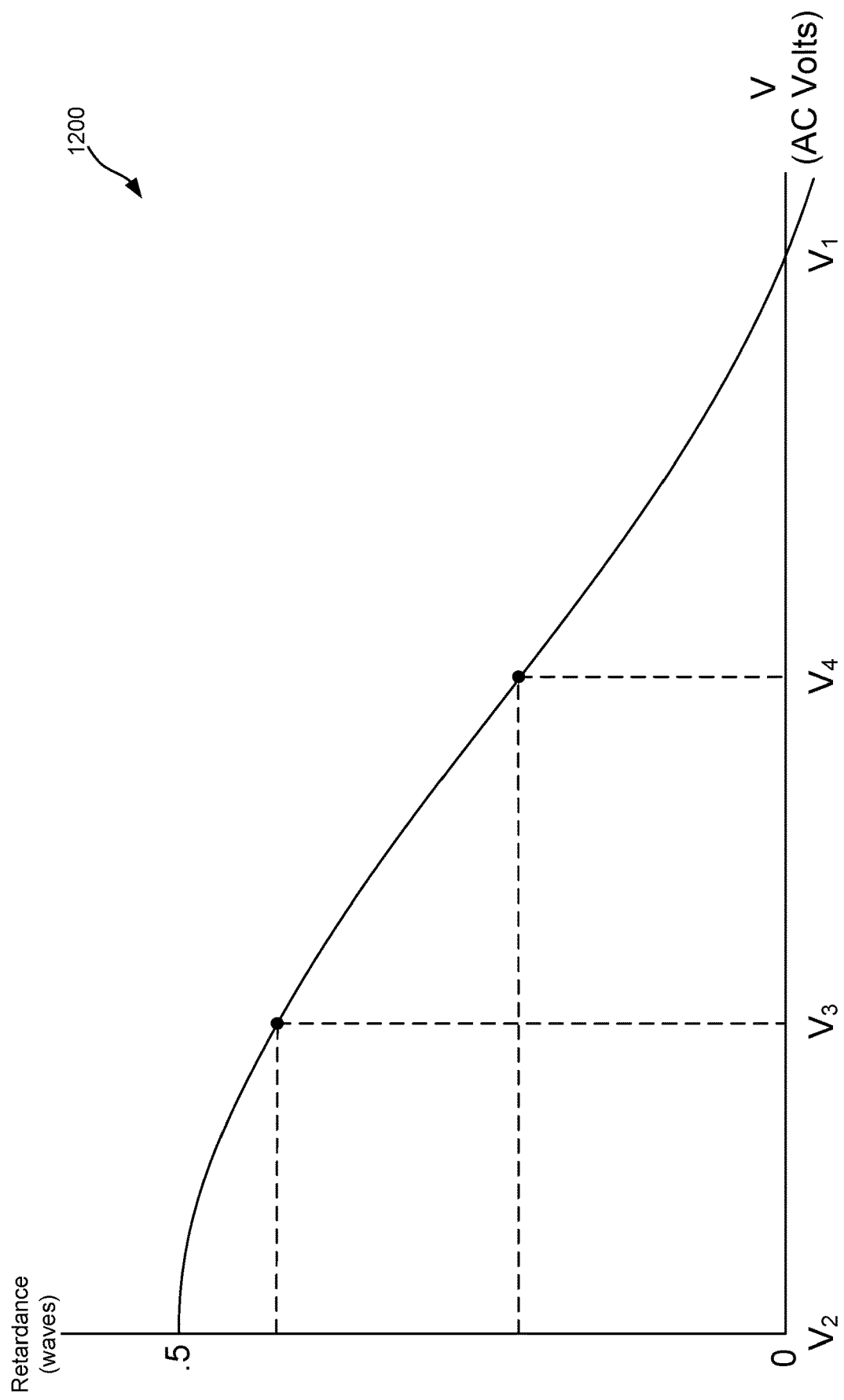
FIG. 12 shows a retardance versus voltage plot for four different states of the LC switch.

FIG. 12 shows a retardance versus voltage plot for four different states of the LC switch. The first and second states are identical to those shown and described relative to FIG. 8. However, third and fourth states are also shown, where applied voltages are between $V_1$ and $V_2$, and result in retardance between that of the first and second states. As can be seen, this enables four levels of attenuation or beam steering. The first state (corresponding to $V_1$) can enable full transmission through an aperture, or no beam steering from an incident direction. The second state (corresponding to $V_2$) can enable full blocking or attenuation through an aperture, and a maximum of beam steering for these four states. The third and fourth states can result in partial attenuation where an aperture at the output is used, and a level of beam steering greater than in the first state, but less than in the second state.

Figure 14:
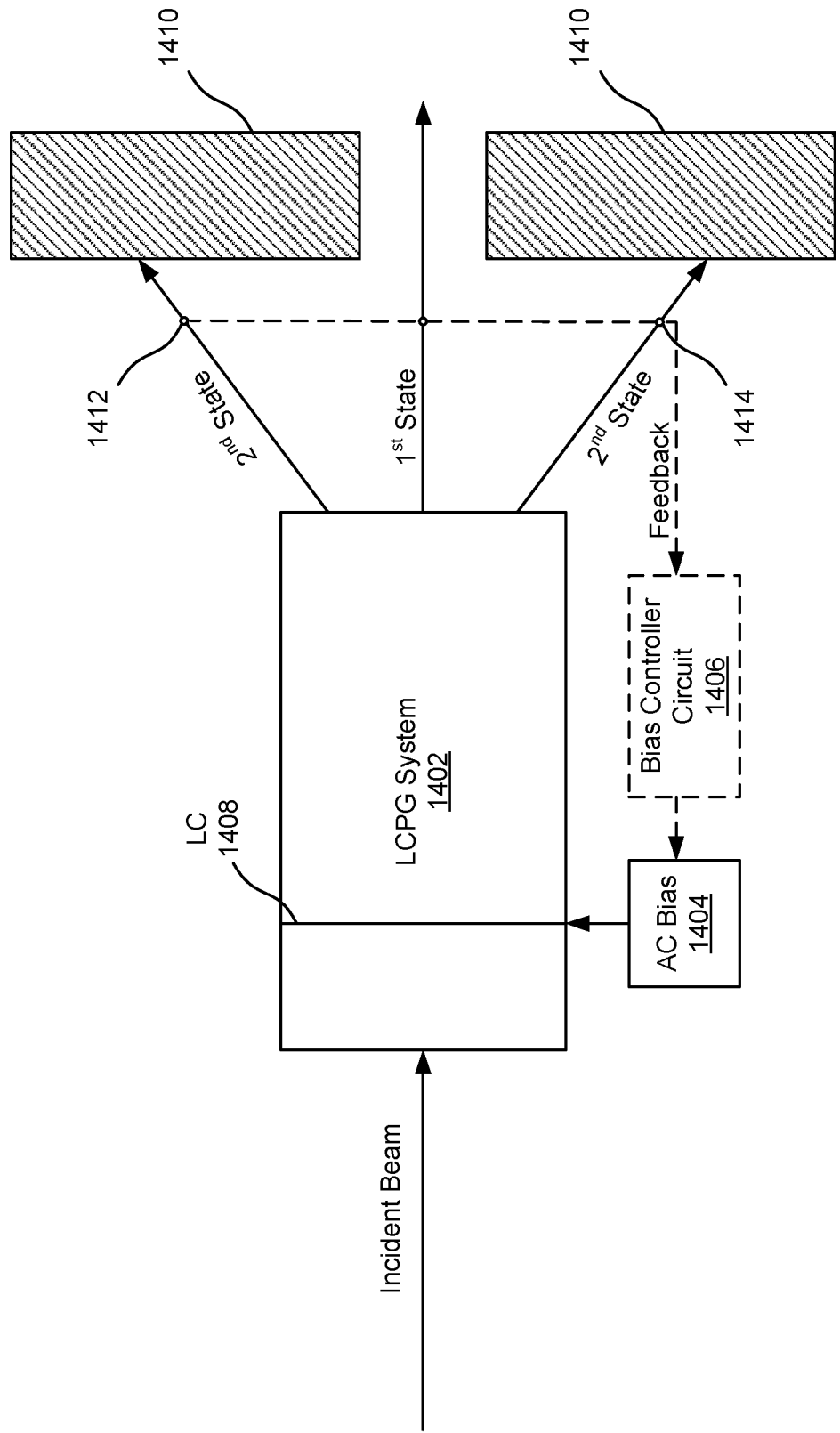
FIG. 14 illustrates an LCPG system having an AC bias and optional feedback for controlling the AC bias.

FIG. 14 illustrates an LCPG system having an AC bias and optional feedback for controlling the AC bias. The LCPG system 1402 can comprise any number of LCPGs as described above, including three and four-grating systems. An LC switch 1408 can be used to alter the polarization of an incident light beam at some point within the LCPG system 1402, for instance, between a first and second LCPG (e.g., in a four-grating system). A first state of the LC switch 1408 can cause the outgoing light beam to follow a path coincident with that of the incident light beam and thereby pass through an aperture 1410. A second state of the LC switch 1408 can cause the outgoing light beam to follow a path oblique to that of the incident light beam and thereby impact and be attenuated by the aperture 1410. The LC switch 1408 can be controlled via application of an AC bias having a first state and a second state, each corresponding to a respective one of the first and second states of the LC switch 1408. An AC bias device 1404 can control the AC bias applied to the LC switch 1408 and an optional bias controller circuit 1406 can control the AC bias device 1404. Optionally, the bias controller circuit 1406 may be coupled to one or more sensors that measure an intensity of the outgoing light beam at one or more locations and receive feedback from these one or more sensors. These one or more sensors could use a nominal amount of light to make readings such that optical throughput is negligibly affected. The bias controller circuit 1406 could then instruct the AC bias 1404 to adjust the LC switch 1408 to achieve a desired light intensity at one or more of the sensors. For instance, where the bias controller circuit 1406 receives feedback indicating an amount of light that is on-axis, the AC bias device 1404 could be instructed to alter the LC switch 1408 until the on-axis light intensity increases beyond a threshold or is optimized (i.e., a desired level of on-axis intensity is found). Although FIG. 14 shows two possible locations for feedback, certain embodiments may only provide feedback from a single position (e.g., an on-axis position). In some embodiments, measurements of light intensity can be taken for both off-axis beams (e.g., at 1412 and 1414) since, depending on a polarization of the incident beams, off-axis intensity may not be the same at both off-axis measurement positions 1412, 1414. Optionally, the LC switch 1408 can have more than two states, each selectable via a different AC bias from the AC bias device 1404.

Figure 15:
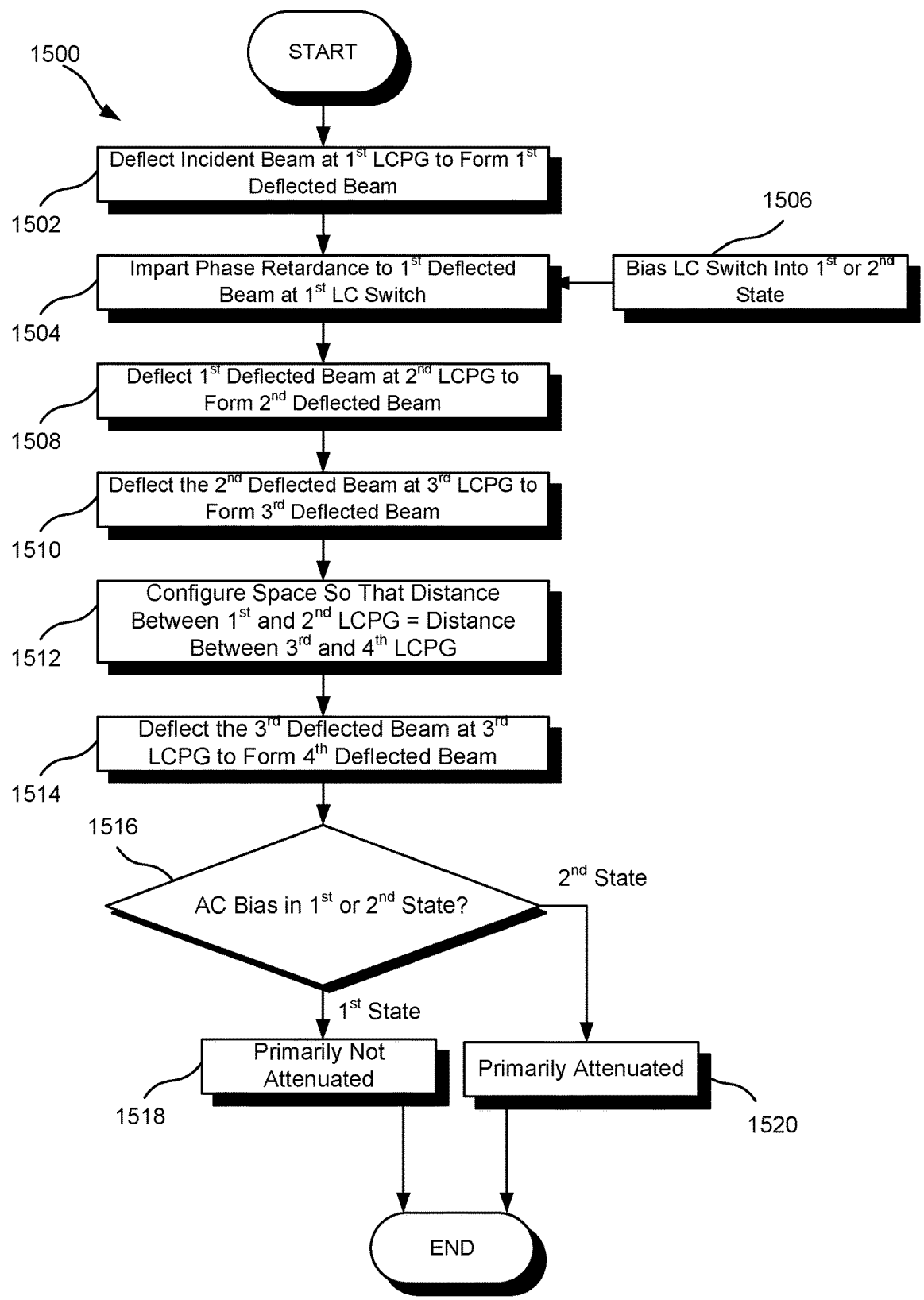
FIG. 15 illustrates a method of operating an LCPG system according to one embodiment of this disclosure.

FIG. 15 illustrates a method of attenuating a light beam using an LCPG system. The method 1500 can include receiving an incident light beam at a first liquid crystal polarization grating (LCPG), the incident light beam optionally being circularly polarized. The first LCPG can deflect a path of the light beam based on a polarization of the incident beam (1502), thereby forming a first deflected beam. Given a certain polarization, a left circular component of the incident beam may be deflected off-axis at a first angle while a right circular component of the incident beam may be deflected off-axis at a second angle equal to the first angle, but angled in an opposite direction relative to an axis of the incident beam. If the incident light is not circularly polarized, or at least not perfectly circular, then the incident beam will be deflected into two first deflected beams. The remainder of the description of FIG. 15 assumes circularly polarized incident light, and thus only a single first deflected beam. However, those of skill in the art will recognize that the method 1500 is also applicable to non-circular incident light and thus those situations where two deflected beams spread out from the first LCPG.

The first deflected beam can pass through a first substrate without deflection, the first substrate configured to support the first LCPG. The first deflected beam can be received at a first liquid crystal switch (LC switch). The liquid crystal switch can impart a phase retardance to the first deflected beam (Block 1504) based on a bias applied to the LC switch (Block 1506). The first deflected beam can then pass through a second substrate without deflection, wherein the second substrate can support a second LCPG. The second LCPG can receive the first deflected beam, and the second LCPG can deflect the first deflected beam based on a polarization of the first deflected beam (Block 1508) thereby forming a second deflected beam. A third LCPG can receive the second deflected beam and deflect the second deflected beam based on a polarization of the second deflected beam (Block 1510), thereby forming a third deflected beam. The third deflected beam can pass through a third substrate without deflection, wherein the third substrate can be configured to support the third LCPG. The third deflected beam can also pass through a space between the third substrate and a fourth substrate, the fourth substrate configured to support a fourth LCPG. The space can be configured to cause a distance between the first and second LCPGs to equal a space between the third and fourth LCPGs (Block 1512). The third deflected beam can then pass through the fourth substrate without deflection, and then be received by the fourth LCPG. The fourth LCPG can deflect the third deflected beam based on a polarization of the third deflected beam (Block 1514) thereby forming a fourth deflected beam. If the LC switch is in a first state, then the fourth deflected beam may pass primarily through an aperture (Decision 1516 and Block 1518). If the LC switch is in a second state, then the fourth deflected beam may be primarily attenuated by the aperture (Decision 1516 and Block 1520).

The foregoing is illustrative of the present disclosure and is not to be construed as limiting thereof. Although a few exemplary embodiments of this disclosure have been described, those skilled in the art will readily appreciate that many modifications are possible in the exemplary embodiments without materially departing from the novel teachings and advantages of this disclosure. For example, the distance, d, in FIG. 7 could be increased to allow a fold mirror or other optical components to be inserted between the two subassemblies. Furthermore, it should be understood that analog attenuation may be achieved by setting the LC cell to an intermediate state. This setting directs some of the light along the path shown in FIG. 2 and some of the light along the path shown in FIG. 3, with amounts depending on the retardance of the LC cell.

Accordingly, many different embodiments stem from the above description and the drawings. It will be understood that it would be unduly repetitious and obfuscating to literally describe and illustrate every combination and subcombination of these embodiments. As such, the present specification, including the drawings, shall be construed to constitute a complete written description of all combinations and subcombinations of the embodiments described herein, and of the manner and process of making and using them, and shall support claims to any such combination or sub combination.

In the specification, there have been disclosed embodiments of the disclosure and, although specific terms are employed, they are used in a generic and descriptive sense only and not for purposes of limitation. Although a few exemplary embodiments of this disclosure have been described, those skilled in the art will readily appreciate that many modifications are possible in the exemplary embodiments without materially departing from the novel teachings and advantages of this disclosure. For instance, the herein disclosed systems, methods, and apparatus could be employed for beam-steering applications. For instance, using an LC switch having a variety of states and polarized input light, enables an output light beam with a selectable exit angle. The use of two or more LC switches could increase the number of exit angles that can be selected, or simplify the circuitry needed to enable such beam steering. Further, in a beam steering application, the location of the one or more LC switches can be varied (for instance residing between LCPG 132 and LCPG 142 or LCPG 102 and LCPG 112). Accordingly, all such modifications are intended to be included within the scope of this disclosure as defined in the claims. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims. The disclosure is defined by the following claims, with equivalents of the claims to be included therein.

That which is claimed:

1. A liquid crystal beam steering device, comprising:
   a first polarization grating configured to direct incident light into first and second beams having different directions of propagation than that of the incident light, the first and second beams having substantially orthogonal circular polarizations with respect to each other;
   a liquid crystal layer configured to receive the first and second beams from the first polarization grating, the liquid crystal layer being switchable between first and second states for introducing a first and second retardance, respectively, to the first and second beams;
   a second polarization grating spaced apart from the first polarization grating by a distance D1 and configured to receive the first and second beams from the liquid crystal layer and to alter the respective directions of propagation of the first and second beams according to the first or second retardance introduced to the first and second beams;
   a third polarization grating configured to receive the first and second beams from the second polarization grating and to further alter the respective directions of propagation thereof;

an intermediate region configured to transmit the first and second beams from the third polarization grating therethrough;

a fourth polarization grating spaced apart from the third polarization grating by the distance D2 and configured to receive the first and second beams from the intermediate region and to additionally alter the respective directions of propagation thereof to provide output light; and an aperture configured to primarily transmit the first and second beams from the fourth polarization grating when the liquid crystal layer is in the first state, and to primarily block the first and second beams from the fourth polarization grating when the liquid crystal layer is in the second state, wherein the first, second, third, and fourth polarization gratings exhibit substantially similar diffractive properties, and wherein D1 is substantially equal to D2.

2. The liquid crystal beam steering device of claim 1, wherein the output light from the fourth polarization grating propagates in a direction substantially:

parallel to that of the incident light when the liquid crystal layer is in the first state; and oblique to that of the incident light when the liquid crystal layer is in the second state.

3. The liquid crystal beam steering device of claim 1, wherein in the first state the liquid crystal layer introduces a retardance of $n\lambda$, and wherein in the second state the liquid crystal layer introduces a retardance of $m+\lambda/2$, where n and m are selected from the set including integers and 0.

4. The liquid crystal beam steering device of claim 3, further comprising an AC bias device configured to selectively apply an AC bias to the liquid crystal layer in order to switch between the first and second state.

5. The liquid crystal beam steering device of claim 4, wherein a thickness of the liquid crystal layer is such that in the first state the liquid crystal layer introduces a retardance of $n\lambda$, and wherein in the second state the liquid crystal layer introduces a retardance of $m+\lambda/2$, where n and m are selected from the set including integers and 0.

6. The liquid crystal beam steering device of claim 1, wherein each of the first, second, third, and fourth polarization gratings is arranged on a substrate, wherein the substrates of the first and second polarization gratings are adjacent to the liquid crystal layer, and wherein the substrates of the third and fourth polarization gratings are adjacent the intermediate region.

7. The liquid crystal beam steering device of claim 6, wherein the first, second, third, and fourth polarization gratings are formed on identical substrates.

8. The liquid crystal beam steering device of claim 7, wherein a thickness of the intermediate region equals a thickness of the liquid crystal layer.

9. A liquid crystal beam steering device, comprising:

a first polarization grating configured to direct incident light into first and second beams having different directions of propagation than that of the incident light, the first and second beams having substantially orthogonal circular polarizations with respect to each other;

a liquid crystal layer configured to receive the first and second beams from the first polarization grating, the liquid crystal layer being switchable between first and second states for introducing a first and second retardance, respectively, to light traveling therethrough;

a second polarization grating spaced apart from the first polarization grating by a distance D1 and configured to receive the first and second beams from the liquid crystal layer to alter the respective directions of propagation of the first and second beams in response to each of the first and second states of the liquid crystal layer;

a third polarization grating configured to receive the first and second beams from the second polarization grating to further alter the respective directions of propagation thereof;

an intermediate region having a thickness and configured to transmit the first and second beams from the third polarization grating therethrough;

a fourth polarization grating spaced apart from the third polarization grating by the distance D2 and configured to receive the first and second beams from the third polarization grating to additionally alter the respective directions of propagation thereof to provide output light that propagates in a direction substantially parallel to that of the first and second beams output from the second polarization grating; and an aperture configured to primarily transmit both first and second beams when the liquid crystal layer is in the first state, and to primarily block both first and second beams therethrough when the liquid crystal layer is in the second state, wherein the first, second, third, and fourth polarization gratings exhibit substantially similar diffractive properties, and wherein D1 is substantially equal to D2.

10. The liquid crystal beam steering device of claim 9, wherein each of the first, second, third, and fourth polarization gratings is arranged on a substrate, wherein the substrates of the first and second polarization gratings are adjacent to and on opposing sides of the liquid crystal layer, and wherein the substrates of the third and fourth polarization gratings are adjacent to the intermediate region.

11. The liquid crystal beam steering device of claim 9, wherein the first, second, third, and fourth polarization gratings are formed on identical substrates.

12. The liquid crystal beam steering device of claim 9, wherein a thickness of the intermediate region equals a thickness of the liquid crystal layer.

13. A liquid crystal beam steering device, comprising:

a first polarization grating configured to direct incident light into first and second beams having different directions of propagation than that of the incident light, the first and second beams having substantially orthogonal circular polarizations with respect to each other;

a liquid crystal layer configured to receive the first and second beams from the first polarization grating, the liquid crystal layer being switchable between first and second states for introducing a first and second retardance, respectively, to light traveling therethrough;

a second polarization grating spaced apart from the first polarization grating and configured to receive the first and second beams from the liquid crystal layer to alter the respective directions of propagation of the first and second beams in response to each of the first and second states of the liquid crystal layer;

a third polarization grating configured to receive the first and second beams from the second polarization grating to further alter the respective directions of propagation thereof;

an intermediate region configured to transmit the first and second beams from the third polarization grating therethrough while modifying the respective directions of propagation thereof;

a fourth polarization grating configured to receive the first and second beams from the intermediate region to additionally alter the respective directions of propagation thereof to provide output light that propagates in a direction substantially parallel to that of the first and second beams output from the second polarization grating; and an aperture configured to primarily transmit both first and second beams when the liquid crystal layer is in the first state, and to primarily block both first and second beams therethrough when the liquid crystal layer is in the second state, wherein the first and second polarization gratings are spaced apart by a distance D, where the third and fourth polarization gratings are spaced apart by the distance D, and wherein the first, second, third, and fourth polarization gratings exhibit substantially similar diffractive properties.

14. The liquid crystal beam steering device of claim 13, wherein the incident light is incident on the first polarization grating at a first angle with respect to an optical axis, wherein the first and second beams exit the fourth polarization grating at the first angle with respect to the optical axis when the liquid crystal layer is in the first state.

15. The liquid crystal beam steering device of claim 13, wherein the intermediate region has a thickness selected such that the distance D between the first and second polarization gratings is the same as the distance D between the third and fourth polarization gratings.

16. The liquid crystal beam steering device of claim 13, wherein each of the first, second, third, and fourth polarization gratings is arranged on a substrate, wherein the substrates of the first and second polarization gratings are adjacent to the liquid crystal layer, and wherein the substrates of the third and fourth polarization gratings are adjacent the intermediate region.

17. The liquid crystal beam steering device of claim 16, wherein a thickness of each of the first, second, third, and fourth polarization gratings is equal and a thickness of the substrates is equal.

18. The liquid crystal beam steering device of claim 13, wherein a thickness of the intermediate region equals a thickness of the liquid crystal layer.

* * * * *